(12) United States Patent
Papadopoulos et al.

(10) Patent No.: US 8,868,258 B2
(45) Date of Patent: Oct. 21, 2014

(54) METHODS AND APPARATUSES FOR AUTONOMOUS FLIGHT TERMINATION

(75) Inventors: George B. Papadopoulos, Nesconset, NY (US); Derek R. DeVries, Farr West, UT (US); Steven W. Thomas, Excellsior, MN (US); Timothy J. Van Dixhorn, Eden Prairie, MN (US); Charles L Weigel, Minneapolis, MN (US); Charles L. Dedon, Elk River, MN (US)

(73) Assignee: Alliant Techsystems, Inc., Arlington, VA (US)

( * ) Notice: Subject to any disclaimer, the term of this patent is extended or adjusted under 35 U.S.C. 154(b) by 206 days.

(21) Appl. No.: 13/567,794

(22) Filed: Aug. 6, 2012

(65) Prior Publication Data

US 2014/0067164 A1 Mar. 6, 2014

(51) Int. Cl.
*F42B 10/48* (2006.01)
(52) U.S. Cl.
USPC .................................................. 701/3; 701/4
(58) Field of Classification Search
CPC ... G05D 1/105; G05D 1/0034; G05D 1/0072; G08G 5/0034; G01C 23/00; F42B 10/16; F42B 10/48
USPC ....................... 701/3, 4, 500, 14, 16, 408, 412
See application file for complete search history.

(56) References Cited

U.S. PATENT DOCUMENTS

| | | | |
|---|---|---|---|
| 5,739,787 A | | 4/1998 | Burke et al. |
| 7,761,199 B2 * | | 7/2010 | Duranti et al. .................. 701/25 |
| 2005/0040280 A1 | | 2/2005 | Hua |
| 2008/0147309 A1 | | 6/2008 | Ivansson et al. |
| 2008/0167762 A1 * | | 7/2008 | Duranti et al. .................. 701/11 |
| 2010/0270418 A1 | | 10/2010 | Gazard |
| 2012/0048993 A1 | | 3/2012 | Velez |
| 2013/0231106 A1 * | | 9/2013 | Knoblach et al. ............. 455/431 |

OTHER PUBLICATIONS

Committee Space et al., "Streamlining Space Launch Range Safety" Dec. 31, 2000. Retrieved from the Internet: http://158.132.155.107/posh97/private/aviation-safety/space-launch-range-safety.pdf. (Retrieved on Apr. 2, 2014).
Invitation to Pay Additional Fees and Partial Search Report in International Application No. PCT/US2013/051615, mailed Apr. 10, 2014.

* cited by examiner

*Primary Examiner* — Marthe Marc-Coleman
(74) *Attorney, Agent, or Firm* — TraskBritt

(57) ABSTRACT

A flight safety assembly onboard an aerial vehicle includes a first sensor configured to sense first information related to flight of the aerial vehicle and a second sensor configured to sense second information related to the flight of the aerial vehicle. A sensor input is adapted to receive third information related to the flight of the aerial vehicle. A processor is operably coupled to the first sensor, the second sensor, and the sensor input. The processor is configured to determine three independent instantaneous impact points for the aerial vehicle by independently analyzing each of the first information, the second information and the third information. The processor is also configured to generate three independent onboard flight termination indicators for each of the three independent instantaneous impact points that intersects with a region to be protected.

55 Claims, 13 Drawing Sheets

METHODS AND APPARATUSES FOR AUTONOMOUS FLIGHT TERMINATION

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W900KK-09-C-0027 awarded by the United States Department of the Army.

TECHNICAL FIELD

Embodiments of the present disclosure relate generally to methods and apparatuses for flight termination of aerial vehicles and, more particularly, to substantially autonomous flight termination of aerial vehicles.

BACKGROUND

Object tracking is the process of utilizing sensors in combination with a known reference point to determine a desired positional fix, and possibly a dynamic fix of an object of interest. The degree of desired fix is specifically determined by collecting and correlating information related to parameters such as time, space and position information. Additionally, by integrating the product of these parameters, one can easily arrive at additional descriptive indicators such as velocity, acceleration, jerk, twisting motions and trajectories.

Radar-based architectures for tracking rockets and similar vehicles ushered in the foundational modern-day concepts of aerial vehicle tracking. The integration and use of these radar assets have synergistically enabled the field of rocketry to evolve into highly sophisticated systems such as the space shuttle. Such launch vehicles require the use of precise sophisticated tracking radar's primarily for safety reasons. Specifically, a trajectory/orbit monitoring officer uses accurate real-time position and velocity data to determine if a launch vehicle has strayed off course during the boost phase. The officer then has the option to safely destroy the vehicle before it can become a hazard to life or property.

Systems have also been proposed for moving some of the real-time trajectory sensing and tracking function from traditional ground/air based radar systems to systems onboard the aerial vehicle itself. However, these systems still include the monitoring officer to interpret the trajectory information and make decisions about flight termination based on the trajectory information transmitted from the aerial vehicle.

There is a need for flight safety systems that can rapidly make decisions to terminate the flight of aerial vehicles. One such need is for methods and apparatuses that determine flight characteristics of an aerial vehicle and make flight termination decisions autonomously rather than the man-in-the-loop systems that are currently proposed.

BRIEF SUMMARY

Embodiments of the present disclosure include a flight safety assembly onboard an aerial vehicle including a first sensor configured to sense first information related to flight of the aerial vehicle and a second sensor configured to sense second information related to the flight of the aerial vehicle. A sensor input is adapted to receive third information related to the flight of the aerial vehicle. A processor is operably coupled to the first sensor, the second sensor, and the sensor input. The processor is configured to determine three independent instantaneous impact points for the aerial vehicle by independently analyzing each of the first information, the second information, and the third information. The processor is also configured to generate three independent onboard flight termination indicators for each of the three independent instantaneous impact points that intersects with a region to be protected.

Embodiments of the present disclosure include a method for determining safety parameters of an aerial vehicle and includes sensing first information related to flight of the aerial vehicle, sensing second information related to the flight of the aerial vehicle, and receiving third information related to the flight of the aerial vehicle from a sensor input. The method also includes determining three independent instantaneous impact points for the aerial vehicle by independently analyzing each of the first information, the second information, and the third information. Three independent onboard flight termination indicators are generated for each of the independent instantaneous impact points that intersects with a region to be protected.

Other embodiments of the present disclosure include a flight safety system for an aerial vehicle including two autonomous flight safety assemblies onboard the aerial vehicle. Each of the two autonomous flight safety assemblies includes a first sensor configured to sense first information related to flight of the aerial vehicle, a second sensor configured to sense second information related to the flight of the aerial vehicle, and a processor operably coupled to the first sensor and the second sensor. The processor is configured to analyze the first information to determine a first projected flight path of the aerial vehicle and analyze the second information to determine a second projected flight path of the aerial vehicle. The processor is also configured to generate an onboard flight termination signal if at least one of the first projected flight path and the second projected flight path indicates that the aerial vehicle will leave a safe window or violate a boundary that designates a keep-in or keep-out zone or area.

Other embodiments of the present disclosure include a flight safety system for an aerial vehicle. A first sensor is configured to sense first information related to flight of the aerial vehicle. A second sensor is configured to sense second information related to the flight of the aerial vehicle. A third sensor is configured to sense third information related to the flight of the aerial vehicle. A fourth sensor is configured to sense fourth information related to the flight of the aerial vehicle. A first processor is operably coupled to the first sensor, the second sensor, and the third sensor and is configured to analyze the first information, the second information, and the third information to determine a first projected flight path of the aerial vehicle by determining if the first projected flight path remains within a safe window and generating a first onboard flight termination signal responsive to the determining. A second processor is operably coupled to the second sensor, the third sensor, and the fourth sensor and is configured to analyze the second information, the third information, and the fourth information to determine a second projected flight path of the aerial vehicle by determining if the second projected flight path remains within the safe window and generating a second onboard flight termination signal responsive to the determining.

Still other embodiments of the present disclosure include a method for determining safety parameters of an aerial vehicle. The method includes developing at least two independent analysis paths of a flight path of the aerial vehicle, wherein each of the at least two independent analysis paths are performed onboard the aerial vehicle. In addition, each of the at least two independent analysis paths include the acts of sensing one or more parameters related to the flight of the aerial vehicle, determining a projected flight path of the aerial vehicle responsive to the one or more parameters, and generating an onboard flight termination signal if at least one of the at least two independent analysis paths indicate the aerial vehicle will leave a safe window.

Still other embodiments of the present disclosure include a method for determining safety parameters of an aerial vehicle. The method includes sensing first information related to flight of the aerial vehicle, sensing second information related to the flight of the aerial vehicle, sensing third information related to the flight of the aerial vehicle, and sensing fourth information related to the flight of the aerial vehicle. The method also includes analyzing the first information, the second information, and the third information to determine a first projected flight path of the aerial vehicle, and analyzing the second information, the third information, and the fourth information to determine a second projected flight path of the aerial vehicle. The method also includes generating a first onboard flight termination signal if the first projected flight path indicates the aerial vehicle will leave a safe window and generating a second onboard flight termination signal if the second projected flight path indicates the aerial vehicle will leave the safe window.

Still other embodiments of the present disclosure include a method for determining safety parameters of an aerial vehicle. The method includes analyzing a flight path of the aerial vehicle onboard the aerial vehicle. Analyzing the flight path includes sensing at least two parameters related to the flight of the aerial vehicle, determining a projected flight path of the aerial vehicle responsive to the at least two parameters, and analyzing the projected flight path relative to a safe window. The method also includes generating an onboard flight termination indicator if the projected flight path indicates the aerial vehicle will leave the safe window. The acts of analyzing the flight path and generating the onboard flight termination indicator is repeated a plurality of times. An onboard flight termination signal is generated if the onboard flight termination indicator is active for the plurality of times.

Embodiments of the present disclosure also include a flight safety assembly onboard an aerial vehicle including a first sensor configured to sense first information related to flight of the aerial vehicle and a second sensor configured to sense second information related to the flight of the aerial vehicle. A memory is configured to store the first information in a first region and the second information in a second region. A processor is operably coupled to the first sensor, the second sensor, and the memory. The processor is configured for performing computing instructions using the first information to determine a first instantaneous impact point for the aerial vehicle and generate a first onboard flight termination indicator if the first instantaneous impact point intersects with a region to be protected. The processor is also configured for performing the computing instructions using the second information to determine a second instantaneous impact point for the aerial vehicle and generate a second onboard flight termination indicator if the second instantaneous impact point intersects with the region to be protected.

Embodiments of the present disclosure also include a method for determining safety parameters of an aerial vehicle and includes receiving sensor information from at least two different sensors, each sensor for sensing one or more parameters related to flight of the aerial vehicle. The sensor information from the at least two different sensors is stored in at least two corresponding and independent regions of a memory. The sensor information in a first of the independent regions of the memory is processed to determine a first projected flight path of the aerial vehicle and generate a first onboard flight termination signal if the first projected flight path indicates that the aerial vehicle will leave a safe window. The sensor information in a second of the independent regions of the memory is processed to determine a second projected flight path of the aerial vehicle and generate a second onboard flight termination signal if the second projected flight path indicates that the aerial vehicle will leave the safe window.

Embodiments of the present disclosure also include a method for determining safety parameters of an aerial vehicle and includes receiving sensor information from at least two different sensors, each sensor for sensing one or more parameters related to flight of the aerial vehicle. The sensor information from the at least two different sensors is stored in a memory. The sensor information is processed with at least two code segments in independent address spaces of the memory wherein each of the at least two code segments analyzes the sensor information to determine a projected flight path of the aerial vehicle, determines if the projected flight path of the aerial vehicle is within a safe window, and generates an onboard flight termination signal if the aerial vehicle will leave the safe window.

DETAILED DESCRIPTION

Figure 1:
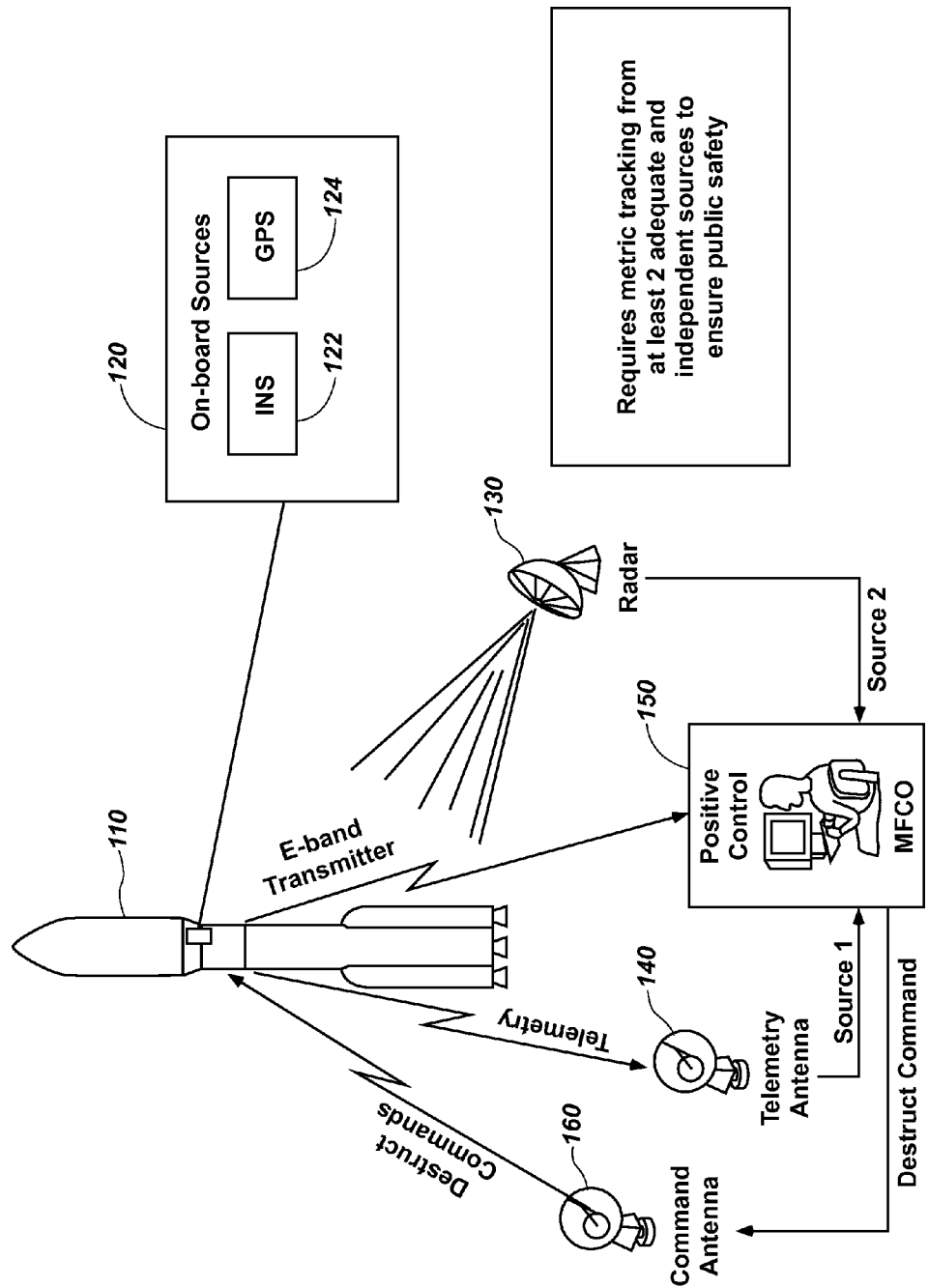
FIG. 1 illustrates a conventional flight safety system.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present disclosure is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In this description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be rearranged.

Figure 3:
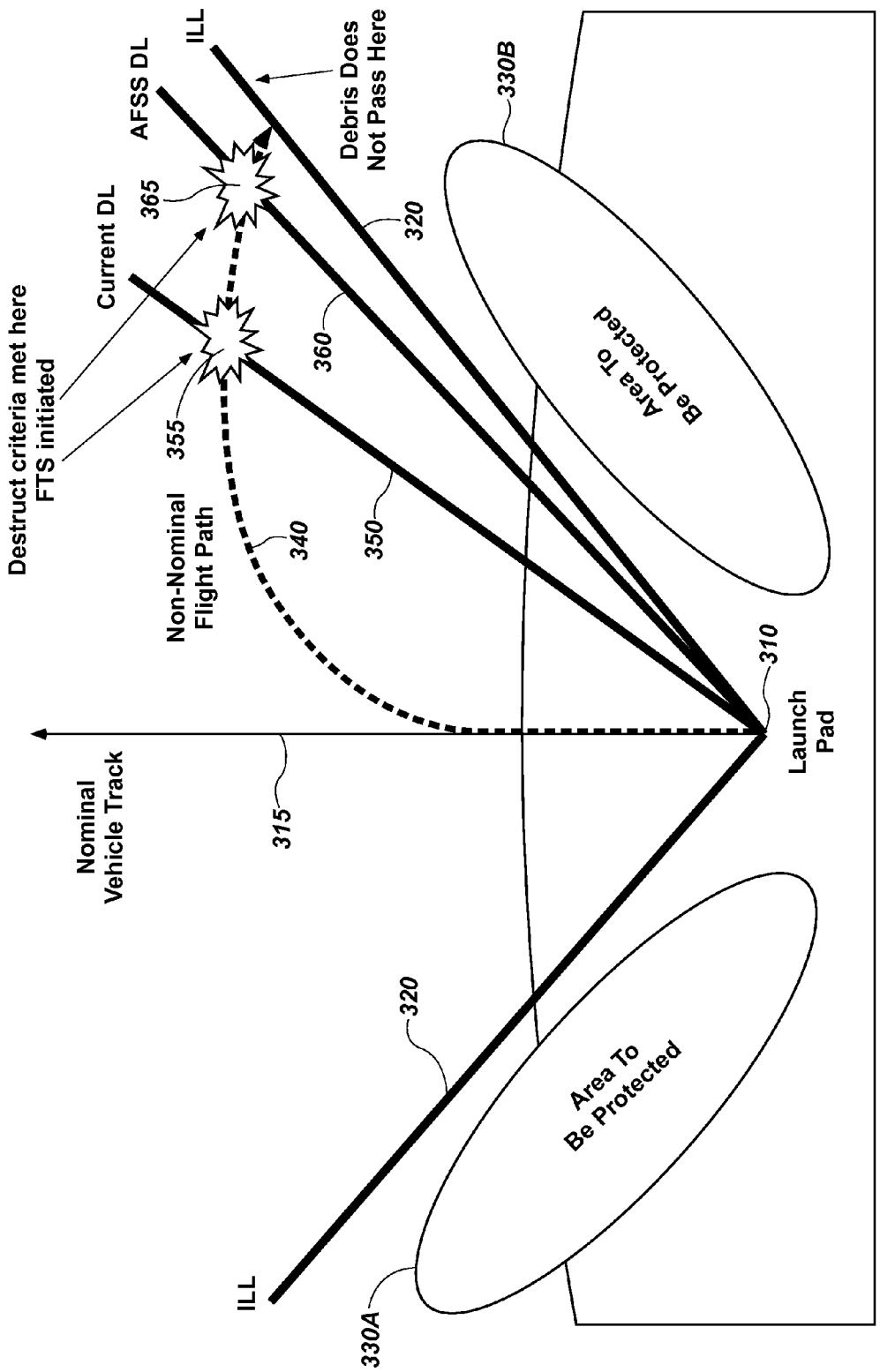
FIG. 3 illustrates improvements to a flight termination decision with one or more embodiments of the present disclosure.

Elements described herein may include multiple instances of the same element. These elements may be generically indicated by a numerical designator (e.g. 110) and specifically indicated by the numerical indicator followed by an alphabetic designator (e.g., 110A). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

As used herein, "aerial vehicle" refers to any aerial vehicle that may become a threat to ground positions that are desired to be protected from the aerial vehicle deviating from a desired course. Most of the discussion herein concentrates on ballistic-type aerial vehicles that are launched and follow a ballistic trajectory from a ground position. However, the aerial vehicle may also be launched from other air vehicles (e.g., airplanes and helicopters) and sea vehicles. Moreover, embodiments of the present disclosure are also applicable to other aerial vehicles, such as, for example, remote controlled aircraft and space vehicles including manned and unmanned exploratory and satellite systems. With remote controlled aircraft (e.g., Unmanned Aerial Vehicles) that malfunction, embodiments of the present disclosure can destroy the aircraft to protect sensitive information from discovery if the aircraft were to return to Earth or to avoid ground positions that are desired to be protected. Finally, embodiments disclosed herein may also be configured to operate with many ground vehicles (e.g., autonomous motorized vehicles).

Traditional flight termination systems (FTS) rely on a man-in-the-loop to monitor vehicle flight path and related vehicle trajectory performance parameters based on multiple radar tracking sources along with sensory data sent from onboard the vehicle via telemetry. An autonomous flight safety system (AFSS) according to embodiments of the present disclosure brings the decision process onboard the vehicle via digital high-speed processing of positional data coming from onboard sensors. Such sensors may include, for example, an onboard global positioning system (GPS), sensors included in an Inertial Measurement Unit (IMU), and a combination thereof. A Range Safety (RS) flight path and keep-out (or keep-in) areas may be preprogrammed in the AFSS and stored in protective computer memory. Flight deviation allowances and related safety rules also may be uploaded to the AFSS prior to launch and stored in the protective computer memory. Based on real-time navigation data obtained from the onboard sensors during flight, the AFSS can continuously determine an instantaneous impact point (IIP) of the vehicle where the aerial vehicle would return to Earth if propulsion mechanisms failed.

The onboard sensors (e.g., IMU, GPS, or combination thereof) along with an autonomous flight termination unit (AFTU) make up an autonomous flight safety assembly (AFSA). The AFTU, comprised of safety and control, decision, and power modules, makes the decision to terminate the flight in the event the vehicle is becoming hazardous with respect to its predicted instantaneous impact point. As non-limiting examples, the hazardous condition could be caused by being in violation of a range safety boundary, failure to achieve a satisfactory proper orbit, or a violation of a related flight safety rule. Embodiments of the present disclosure include a flight termination system that can be activated as a result of the analysis of the instantaneous impact point to either destroy the aerial vehicle or render the propulsion system inactive.

FIG. 1 illustrates a conventional flight safety system. An aerial vehicle 110 may include onboard sensors 120, such as an inertial navigation system 122 and a global positioning system 124. The aerial vehicle position or sensor data may be downlinked (telemetry) to a telemetry antenna 140 at a ground station. The aerial vehicle 110 may include communication devices (e.g., an E-band transponder and antennas) to transmit flight termination system health data provided to the vehicle's telemetry system to a Missile Flight Control Officer 150 (MFCO). An independent radar system 130 may track the aerial vehicle 110 to determine the flight trajectory of the aerial vehicle 110.

The MFCO 150 uses information from the radar system 130 and the telemetry antenna 140 to determine if the aerial vehicle 110 has violated flight safety criteria (i.e., a human decision process). If there has been a violation, the MFCO 150 activates a signal as a command that is transmitted from a command antenna 160 to the aerial vehicle 110. The signal is received by the aerial vehicle 110 and tells the aerial vehicle 110 to terminate the flight. This process requires highly reliable hardware, which has been thoroughly certified and tested and implemented with redundancy on all subsystems, as well as highly trained personnel who are certified for the role of MFCO 150.

Figure 2:
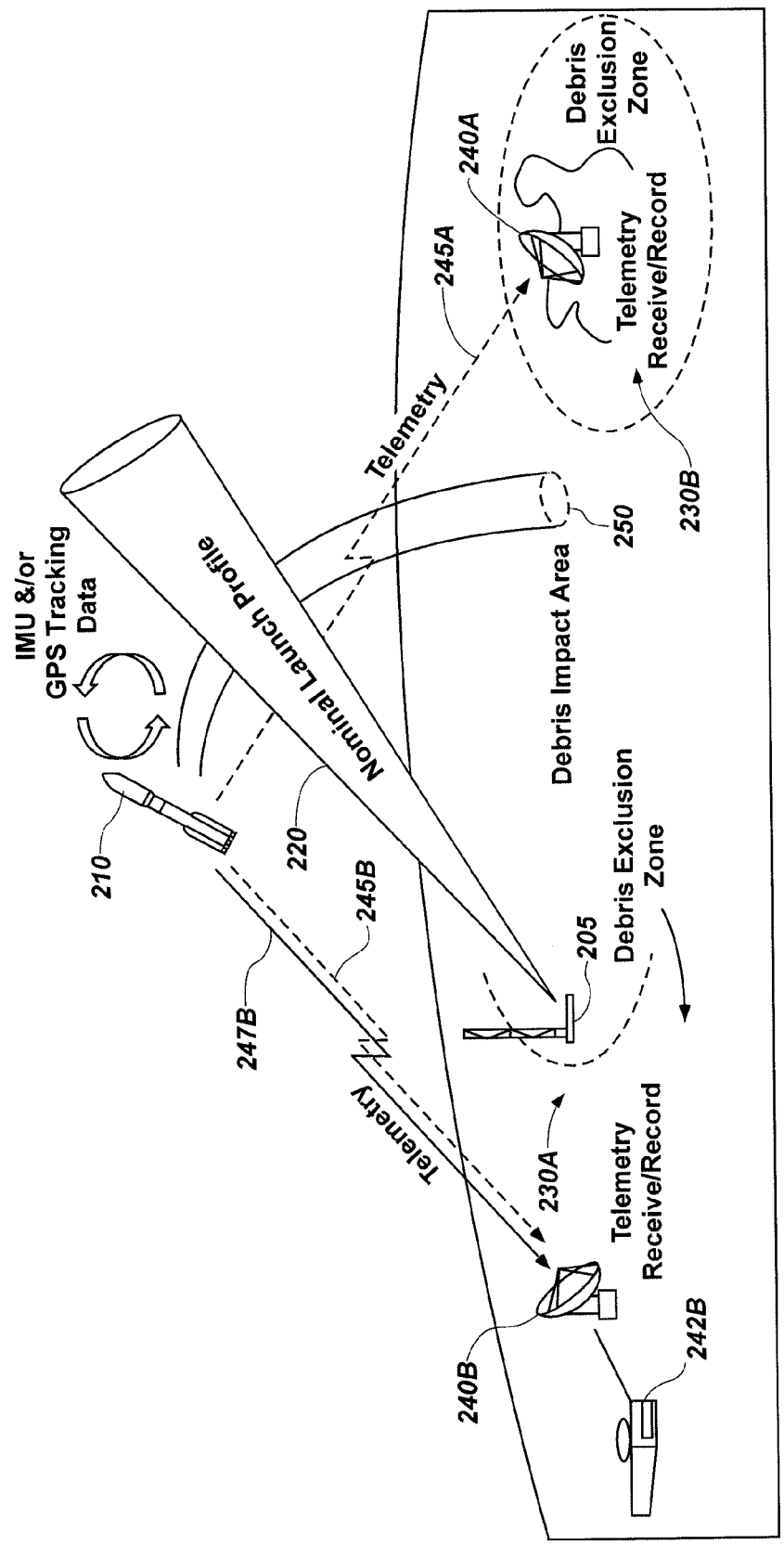
FIG. 2 illustrates an aerial vehicle launch profile.

FIG. 2 illustrates an aerial vehicle launch profile. An aerial vehicle 210 is launched from a launch site 205. A nominal launch profile 220 shows a profile that the aerial vehicle 210 should stay within for a nominal launch. Debris exclusion zones 230A and 230B illustrate areas where there may be a safety issue if the aerial vehicle 210 were to impact the Earth within these areas.

In a conventional system, telemetry data 245A and 245B may be transmitted to ground stations 240A and 240B. This telemetry data 245A and 245B may be non-real-time information about the aerial vehicle 210, such as health of the aerial vehicle 210 and status of internal systems. Near real-time telemetry data 247B may be transmitted to the ground station 240B and include information about the flight trajectory of the aerial vehicle 210 for analysis by a flight control officer (not shown) at a mission control center 242B. The flight control officer uses the flight trajectory information to determine if the flight should be terminated. If the aerial vehicle 210 remains within the nominal launch profile 220, the flight control officer is not likely to terminate the flight. Of course, there may be other reasons to terminate the flight, which may be related to the non-real-time telemetry data 245A and 245B.

The aerial vehicle 210 is illustrated as outside the nominal launch profile 220 and if the flight is terminated at this time, the aerial vehicle 210 would return to Earth within a debris impact area 250. On the present course, the debris impact area 250 has not encroached on one of the debris exclusion zones 230A and 230B. Therefore, the flight control officer may let the flight continue because it does not pose a threat to the debris exclusion zones 230A and 230B. In embodiments of the present disclosure, decision processes about terminating the flight of the aerial vehicle 210 are made autonomously onboard the aerial vehicle 210 if the debris impact area 250 encroaches on one or more of the debris exclusion zones 230A and 230B.

FIG. 3 illustrates improvements to a flight termination decision with one or more embodiments of the present disclosure. An aerial vehicle (not shown) is launched from a launch pad 310. A nominal vehicle track 315 shows the track that the aerial vehicle should follow for a normal flight. Two areas to be protected 330A and 330B are illustrated as areas on the Earth that should be protected from an errant flight or a terminated flight.

Impact limit lines (ILL) 320 show lines extending from the launch site that debris must not pass to ensure that debris from the aerial vehicle does not land within the areas to be protected 330A and 330B. Thus, as long as the flight path of the aerial vehicle remains within the impact limit lines 320, it is considered in a safe zone and there should be no danger to the areas to be protected 330A and 330B. This region within the impact limit lines 320 may be referred to herein as a safe window and a region outside the impact limit lines 320 may be referred to herein as a region to be protected.

Line 340 illustrates a non-nominal flight path that the aerial vehicle may be following. Along this non-nominal flight path 340, the projected flight path will go beyond the impact limit lines 320. As a result, the flight should be terminated. In a conventional flight termination system, a current destruct line 350 may be defined such that if the aerial vehicle flies beyond the current destruct line 350, there will be danger to the areas to be protected 330A and 330B. Thus, a flight control officer must make a decision and cause the flight to be terminated by the termination point 355 where the non-nominal flight path 340 intersects the current destruct line 350.

Embodiments of the present disclosure include apparatuses and methods for determining flight characteristics of an aerial vehicle and making autonomous flight termination decisions onboard the aerial vehicle. An AFSS removes the man-in-the-loop decision and performs an autonomous process to make a flight termination decision and terminate the flight. The AFSS can continuously calculate the vehicle's IIP using input from its onboard navigation sensors. As a result, margins for the destruct lines can be less conservative, hence allowing for more flexibility in path planning in critical areas. An AFSS destruct line 360 illustrates that a decision to terminate the flight, which is made by the AFSS itself, can be delayed to a later termination point 365 where the non-nominal flight path 340 intersects the AFSS destruct line 360.

With the AFSS onboard, the destruct decision is moved to the launch vehicle with telemetry transmission to the ground only needed to provide information for processing post-flight in the event of a vehicle destruct. The AFSS is responsible for either destroying or rendering a flight vehicle non-propulsive when onboard logic determines the vehicle is flying outside predetermined safety limits based on predetermined flight rules for a specific vehicle and mission.

The average response for current man-in-the-loop systems is on the order of two to three seconds, while an AFSS could respond much faster (e.g., approximately 500 milliseconds or less). Moreover, a 500-millisecond decision time may be based on a number of times through a decision cycle performed by the AFSS to validate a hazardous condition prior to deciding on termination and the amount of data required to telemeter out for post-flight analysis prior to executing a termination decision. While the 500-millisecond decision time assumes a typical decision cycle of 100 milliseconds, through tailoring of the IIP calculation process (rules processed, boundary points, etc.), number of sensors, and the telemetry out stream, faster decision cycles can be achieved to meet niche application needs that require even faster response time (e.g., gun launched guided projectiles that can leave the barrel at several kilometers/second).

In addition to being faster and allowing a longer flight time before a termination decision is made, the AFSS also can be more cost effective than man-in-the-loop solutions and more generic to many different types of aerial vehicles relative to conventional systems, and thus can be easily configured to meet the needs of future flight testing of a range of vehicle applications and configurations without significant modification.

Figure 4:
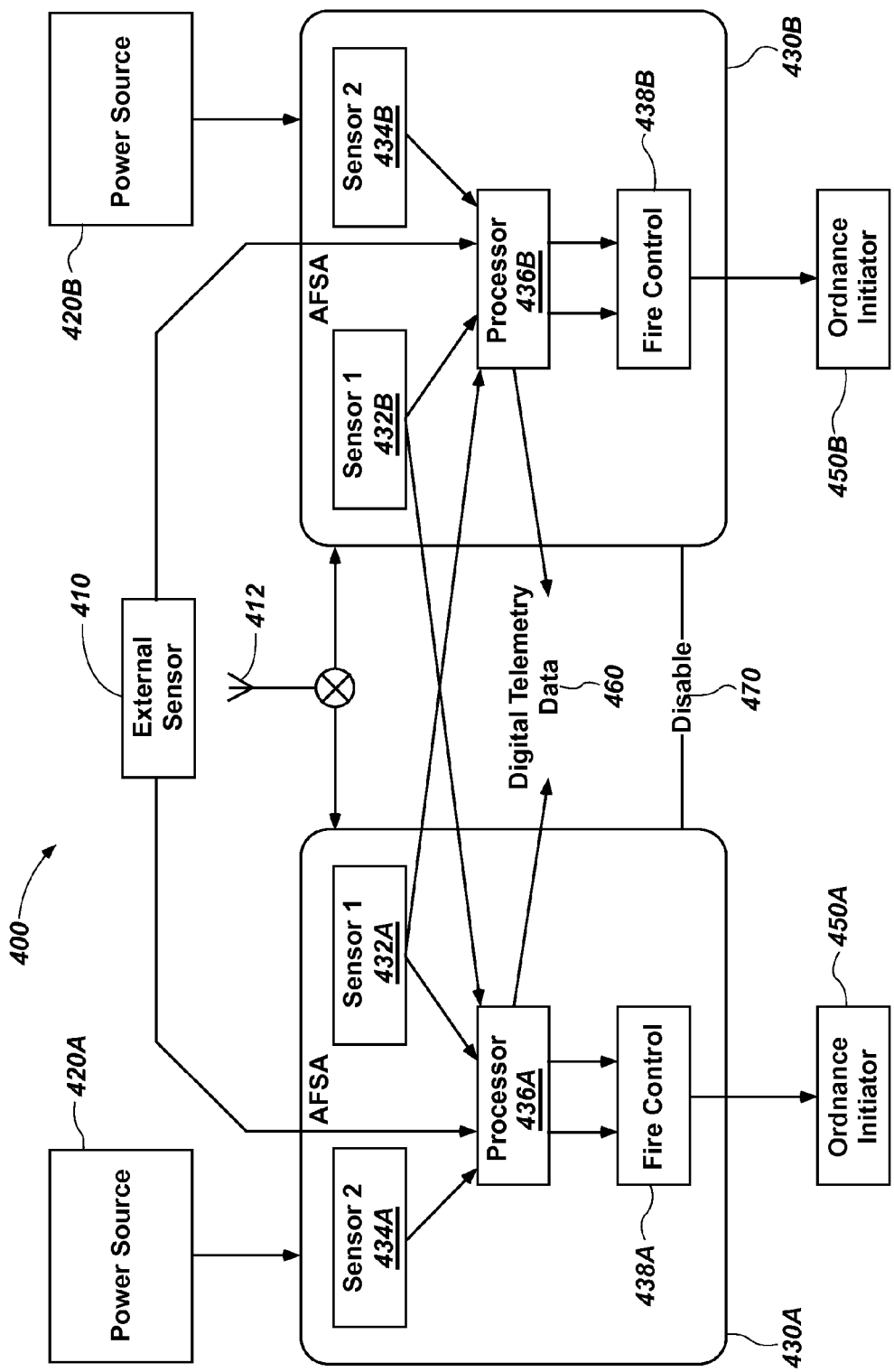
FIG. 4 illustrates a high-level functional block diagram of an autonomous flight safety system.

FIG. 4 illustrates a high-level functional block diagram of an autonomous flight safety system 400. The autonomous flight safety system 400 may include two autonomous flight safety assemblies (AFSAs) 430 that operate in a substantially independent manner. Each AFSA (430A and 430B) includes a first sensor (432A and 432B), a second sensor (434A and 434B), a processor (436A and 436B), and a fire controller (438A and 438B).

A GPS antenna 412 may feed both autonomous flight safety assemblies (430A and 430B) and may couple to one or more of the first sensor (432A and 432B) and the second sensor (434A and 434B). A common disable signal 470 may be supplied to both flight safety assemblies (430A and 430B). Telemetry data 460 may be provided between each of the flight safety assemblies (430A and 430B) and other electronics on board the aerial vehicle 210 (FIG. 2). In some embodiments, each flight safety assemblies (430A and 430B) may couple to a separate power source (420A and 420B).

An external sensor 410 may be included and provide sensor information related to flight of the aerial vehicle 210 (FIG. 2) to each of the flight safety assemblies (430A and 430B). In addition, or alternatively, the first sensor 432A and 432B from each flight safety assembly (430A and 430B) may be cross-strapped to the other flight safety assembly (430A and 430B). Thus, the processor (436A and 436B) may have access to flight information from at least two independent sources and as many as four independent sources. In one embodiment the processor (436A and 436B) has access to its own first sensor (432A and 432B), its own the second sensor (434A and 434B), and the first sensor (432B and 432A) from the other flight safety assembly (430A and 430B).

The software may be configured to evaluate the mission rules against each active sensor input (e.g., three sensors) to determine if a rule requires an action (e.g., safe or terminate) to occur. Decision logic evaluates each sensor source independently and may include an incrementing stair-step function. Once the stair step function reaches a predetermined threshold, an onboard flight termination indicator may be asserted for each active sensor that reaches the threshold. If half or more of the active sensors indicate a terminate status, the fire controller (438A and 438B) will generate an onboard flight termination signal to an ordnance initiator (450A and 450B). After sending an onboard flight termination signal (e.g., a FireEnable command) the flight safety assembly (430A and 430B) will reevaluate the sensor inputs to verify the terminate majority vote. If that verification is successful, the flight safety assembly (430A and 430B) will complete the termination sequence by sending a Fire command.

As a non-limiting example, either flight safety assembly (430A or 430B) unit can terminate the flight based on voting three independent instantaneous impact points, each calculated from its related sensor inputs. This approach increases mission assurance and ensures that the loss of either first sensor data or second sensor data does not result in an auto-terminate decision.

Interfacing to the vehicle control and guidance system is optional, making the embodiments more universally applicable. If vehicle guidance integration is desired, it can provide either a navigation solution and/or include a vehicle operational status signal from the guidance computer. It should be noted, however, that decisions made based on tracking source input or other signals that are interfaced to the vehicle may need to be carefully evaluated and properly weighted in the face of similar inputs from very independent sources.

Additional sensors could be added for mission assurance. Thus, the architecture is scalable to allow more redundancy for increased reliability and safety for manned missions. The decision architecture is shown to be configured with one processor in a redundant set of units, each independent of the other. The architecture can also be expanded to include redundant processors (more than one) to allow for increased mission assurance and dual fault tolerance requirements of manned space missions. The device is configurable to accept an external input as an additional piece of information to provide the ability to detect events from the launch system.

Figure 5:
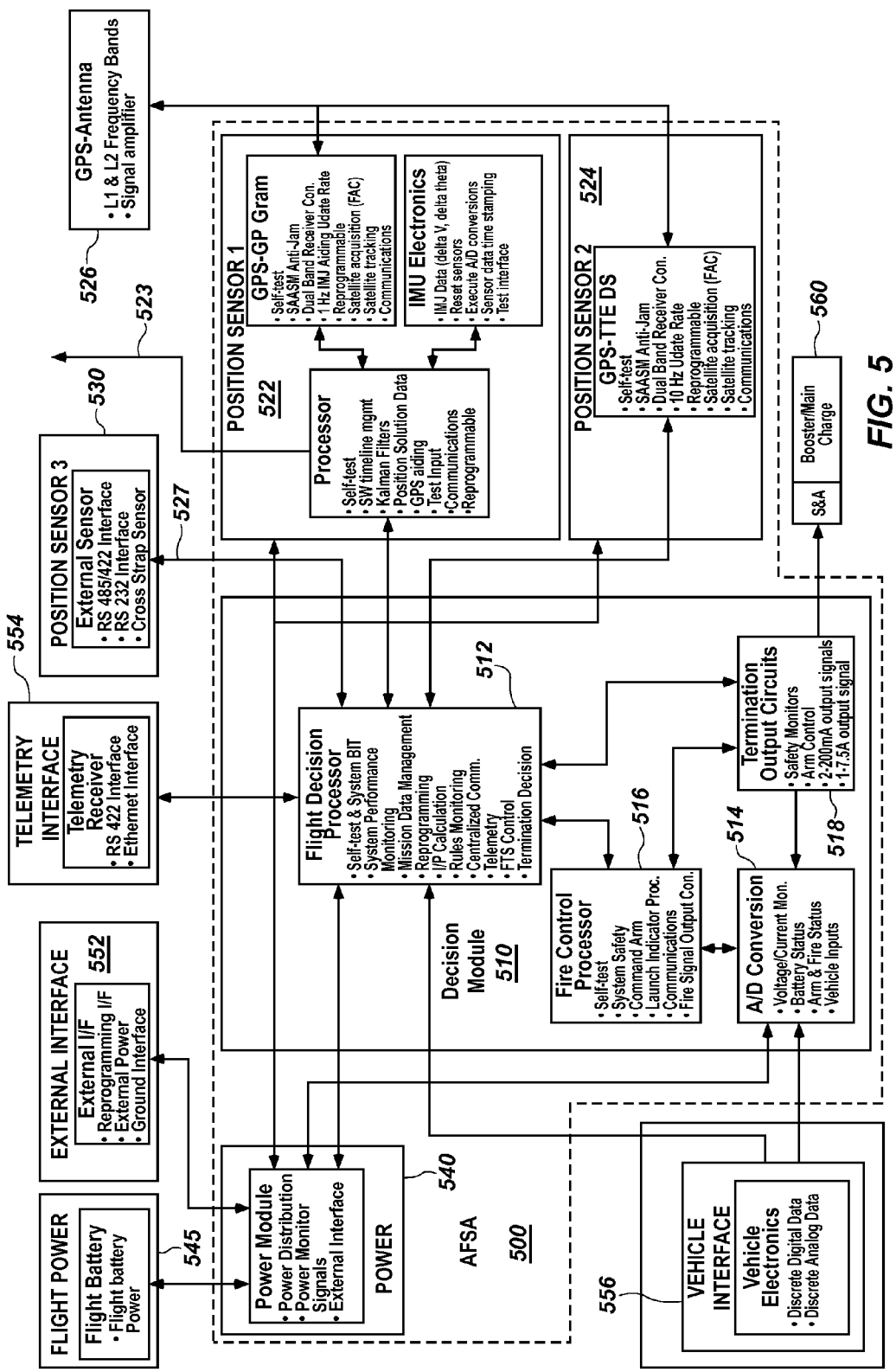
FIG. 5 illustrates a detailed functional block diagram of an autonomous flight safety assembly.

FIG. 5 illustrates a detailed functional block diagram of an autonomous flight safety assembly (AFSA) 500. A power module 540 provides power to the various devices of the AFSA 500 such as a decision module 510, a first sensor 522, a second sensor 524, and a safe and arm module 560. The power module 540 may also be configured to monitor power status within the AFSA 500. During flight, the power module 540 may receive power from a flight battery 545. An external interface 552 may supply power to the AFSA 500 prior to flight of the aerial vehicle 210 (FIG. 2) and may be configured to include a sensor to indicate whether external power is connected (e.g., through an umbilical connection), which can indicate that the AFSA 500 has entered a flight mode when the umbilical is disconnected. Transfer of power between the flight battery 545 and the external interface 552 may be controlled by a ground command from the external interface 552, a vehicle interface 556 or a telemetry interface 554 and may be accomplished by a switch and diode or gate that allows battery power to be applied, but not used until the ground power (i.e., power from the external interface 552) is removed. This capability provides a convenient method of transferring power without its interruption during the transfer. The circuit also provides protection for reverse polarity and prevents ground power from damaging the batteries by blocking ground current from entering the batteries' circuit. The opposite is also true, i.e., blocking battery current from flowing into the ground power system. The power module 540 then regulates and distributes power to the other devices in the AFSA 500.

A vehicle interface 556 may be included to supply signals to the AFSA 500 while the aerial vehicle 210 (FIG. 2) is still on the ground. As a non-limiting example, the vehicle interface 556 may include four analog channels to an analog-to-digital interface 514 and a digital channel to a decision processor 512. Thus, the vehicle interface 556 may be used to monitor function of various sensors and operations of other devices on the AFSA 500.

The telemetry interface 554 may be included to move data between a telemetry system on the aerial vehicle 210 (FIG. 2) and the AFSA 500. Thus, information about the health and flight status of the aerial vehicle 210 may be available to the AFSA 500 for processing. Moreover, in some embodiments, the telemetry interface 554 may include additional flight sensor data such as Position, Velocity, and Time (PVT) from other sensors (not shown) onboard the aerial vehicle 210. As non-limiting examples, the telemetry interface 554 may be a serial interface such as Ethernet or an RS-422 interface.

In one embodiment, three independent sensors can be interfaced to the decision module 510 and each may take the faun of a Global Positioning System (GPS) sensor, an Inertial Management Unit (IMU) sensor, or a combination thereof. These sensors provide redundancy and can be interfaced to the decision module 510 for tracking flight position. As a non-limiting example, the sensor data may provide Position, Velocity, and Time (PVT)-type information to the decision module 510. In other embodiments, the information from the sensors may be in a more raw format and the raw information may be processed by the flight decision processor 512 to determine PVT type information.

Position sensor 3 (530) is a sensor that is external to the AFSA 500. In some embodiments, the external sensor 530 is coupled to a sensor input 527 and in some embodiments may be coupled to a stand-alone sensor. In other embodiment, the external sensor may be a sensor that is part of the aerial vehicle 210 (FIG. 2), but has an output that can supply PVT-type information to the AFSA 500 through the sensor input 527. In other embodiments, the sensor input 527 may be connected to a sensor output 523 of another AFSA 500 onboard the aerial vehicle 210. As non-limiting examples, the sensor input 527 and the sensor output 523 may be configured as a RS-232, RS-485/422 interface.

A Global Positioning System (GPS) antenna 526 may be configured for reception in the L1 and L2 bands and may include a signal amplifier to supply GPS information to a first sensor 522 and a second sensor 524.

A first sensor 522 (may also be referred to herein as position sensor 1) is included within the AFSA 500 and couples to a flight decision processor 512 on the decision module 510. As a non-limiting example indicated in FIG. 5, the first sensor 522 may be configured to include a Global Positioning System (GPS) element to determine and provide substantially real-time position information of the AFSA 500 (and the aerial vehicle 210 (FIG. 2) when the AFSA 500 is attached to the aerial vehicle 210) using the GPS satellite system. The first sensor 522 may also include an IMU to provide another sensor path that can sense inertial parameters responsive to motion of the aerial vehicle 210. In some embodiments, a processor may be included in the first sensor 522 to gather and condition the sensor information from the GPS sensor and the IMU sensor prior to sending the information (e.g., PVT-type information) to the flight decision processor 512. The processor in the first sensor 522 may perform functions such as, for example, self-tests, software timeline management, filtering (e.g., Kalman filtering), position solution processing, GPS aiding, and communication. In some embodiments, the processor in the first sensor 522 may include a test input and may be reprogrammable through the test input.

A second sensor 524 (may also be referred to herein as position sensor 2) is included within the AFSA 500 and couples to the flight decision processor 512. As a non-limiting example indicated in FIG. 5, the second sensor 524 may be configured to include a Global Positioning System (GPS) element to determine and provide substantially real-time position information of the AFSA 500 (and the aerial vehicle 210 (FIG. 2) when the AFSA 500 is attached to the aerial vehicle 210) using the GPS satellite system.

As a non-limiting example, each of the GPS elements in the first sensor 522 and the second sensor 524 may be configured to include a self-test, Security and Anti-Spoofing Module (SASM) anti jam functions, dual-band receiver control, a 10 Hz update rate, satellite acquisition functions, satellite tracking functions, and communication functions. In some embodiments, the GPS elements may be reprogrammable.

As a non-limiting example the IMU sensor may be configured to include delta-V information (i.e., translational information), delta-theta information (i.e., rotational information) on three independent axes to provide six-degree-of-freedom type information. The IMU sensor may include analog-to-digital conversion, time stamping functions, a reset function, a telemetry interface, and a test interface.

The decision module 510 tracks the vehicle's position on the Earth and by comparison to "fly/no fly" rules, decides whether the vehicle presents a safety hazard. If the vehicle is deemed a hazard, the decision module 510 may initiate flight termination.

The flight decision processor 512 accepts regulated power from the power module 540, accepts Earth position data through the GPS and INS ports (i.e., the first sensor 522, the second sensor 544, and the sensor input 527), monitors performance data from a fire control processor 516, outputs flight status and accepts uploaded ground commands when connected to an external interface. The flight decision processor 512 may also be configured to make the flight termination decisions based on information uploaded prior to the mission, and may continually report system status to the ground via the telemetry interface 554.

The flight decision processor 512 may include a self-test and system built-in test function to perform internal testing of the flight decision processor 512, the fire control processor 516, memory (not shown), and status of other hardware within the system. The self-test may include functions such as, for example, checking the processors and executable software by performing operations that verify correct operation. These operations may include computing a Cyclic Redundancy Check (CRC) of the executable image and performing arithmetic operations while verifying that the correct values are returned for each operation. In addition, a status request may be sent to the fire control processor 516 to verify its state and that it is communicating properly.

The flight decision processor 512 may include system performance monitoring to continually monitor system power and functional performance of the hardware while in flight. This monitoring may include functions to monitor the power system voltage levels and other functional measurements that may be important to proper operation of the AFSA 500.

A mission data management function may accept and act upon mission data downloaded for the specific mission to be performed. A reprogramming function enables reprogramming with new mission rules as well as new software with future enhancements as they develop. A calculation function calculates the real-time IIP based on data collected during flight. A rules monitoring function applies rules as dictated by the Mission Data Load (MDL) and determines any violations. A centralized communication function handles data input from all the system interfaces such as, the fire control processor 516, the first sensor 522, the second sensor 524, and the external (ground) interface.

A telemetry function may output a telemetry data stream to a vehicle telemetry module (not shown) through the telemetry interface 554 and may contain built-in-test information, flight and termination status, and information to be sent to the ground prior to termination in the event termination is initiated by a termination rule. A flight termination system (FTS) function may control commands for arming, safing, and firing of an external termination mechanism in combination with the fire control processor 516. A termination decision function initiates the vehicle flight termination should a rule violation indicate that the vehicle flight has become hazardous to the public.

The fire control processor 516 controls safety for the system including arming, monitoring of flight environments, initiating flight termination, and/or rendering the system safe under the commands of the flight decision processor 512. The fire control processor 516 includes safety inhibits for the arm and fire signals. A self-test function may be included for internal testing of the fire control processor 516 and other hardware such as termination output circuits 518 for proper functionality similar to the decision module self-test. A system performance monitoring function includes continual monitoring of all system power and arm and fire status of the fire control processor 516.

The termination output circuits 518 control generation of one or more termination signals responsive to inputs from the flight decision processor 512 and the fire control processor 516. Additional details of the termination output circuits 518 are provided below in connection with FIGS. 12 and 13. In some embodiments, the termination output circuits 518 may generate three outputs. For example, one output may be about a 7.5 amp output that is asserted for about 200 milliseconds to a safe and arm device. Two other outputs may be configured as about 200 milliamps that can be asserted at different times to trigger different events. For example, one output may provide a signal to shut down rocket motors or control an enable switch to the safe and arm device. These outputs may be programmed for various uses depending on what type of aerial vehicle 210 the AFSA 500 is installed on.

The embodiment of FIG. 5 illustrates a fire control processor 516 and a flight decision processor 512. These processors may be any suitable type of microprocessor, microcontroller, custom logic, or combinations thereof. In addition, some embodiments may be configured using a single processor to perform the fire control processes and the flight decision processes.

Figure 6:
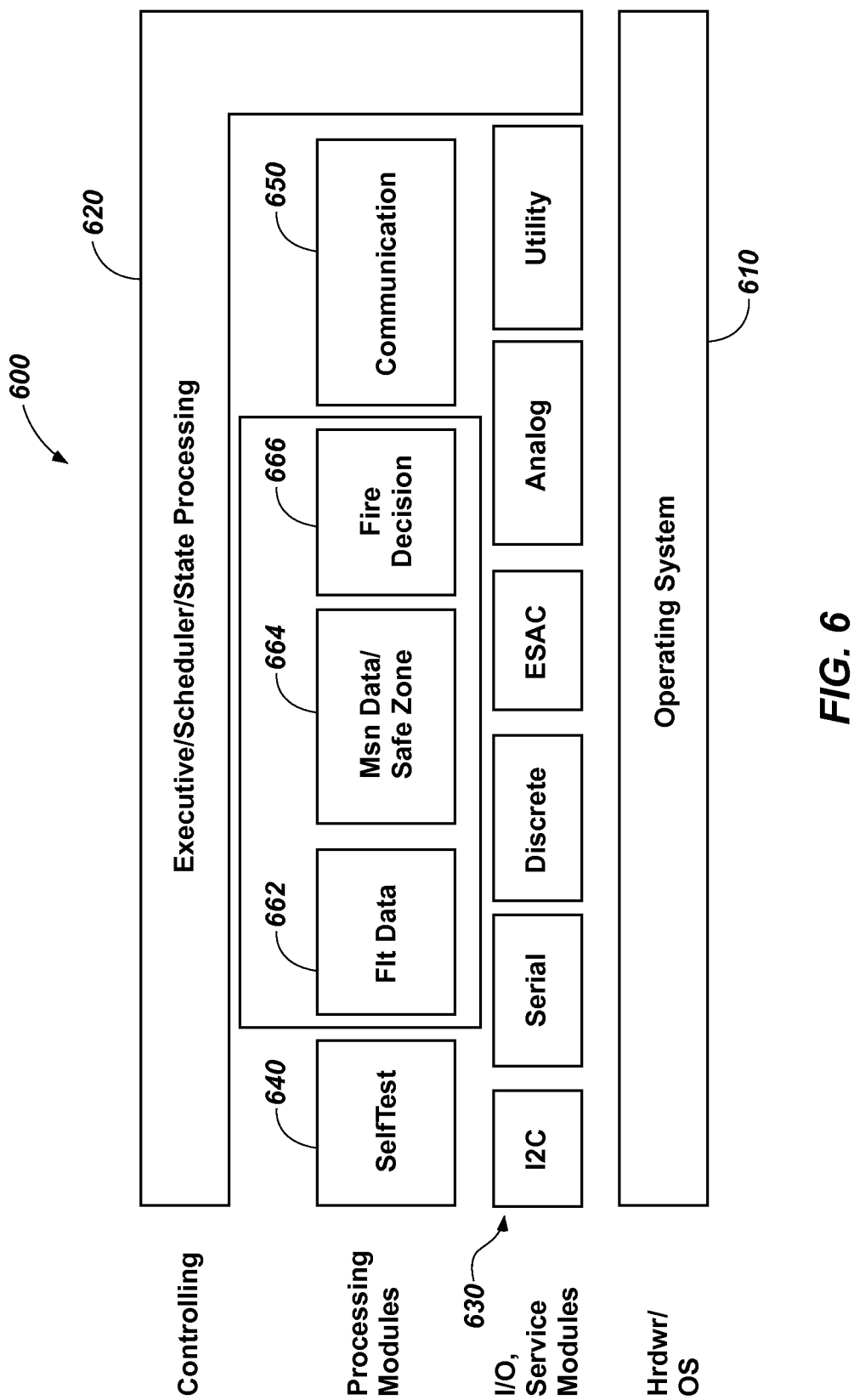
FIG. 6 illustrates a software block diagram illustrating software that may be performed on the autonomous flight safety assembly.

FIG. 6 illustrates a software block diagram illustrating a software architecture 600 that may be used on the autonomous flight safety assembly. The architecture may be modular and layered to promote ease of modification to specific sections of the code. In particular, it offers the possibility to modify the decision logic and hardware interfaces without changes to other modules.

The modules and layers of the architecture are shown in FIG. 6. In general, modules can call routines within themselves or in the layer below. Modules can use data types from other modules in the same layer or lower by including the appropriate header file. Some embodiments may be configured such that only the top two layers can pass data through shared memory.

A general operating system 610 may be provided at a lowest level. As non-limiting examples, a number of Input/Output (I/O) service modules 630 may be included such as modules for I²C, serial interfaces, analog interfaces, utility interfaces, discrete logic interfaces, and interfaces to safe and arm control.

An executive module 620 provides a main calling loop. Additional functionality can be implemented, such as scheduling for multi-tasking as well as exception handling. A communications module 650 provides routines to handle the communication interfaces between the other modules and the hardware-specific interfaces. An initialization and self-test module 640 provides routines for initializing and allocating memory, as well as routines for power-up and performing operational self-tests.

A flight data module 662 provides routines to receive sensor inputs and check their validity. This module may be enhanced to provide sensor data check and comparison as another added layer of validation, if desired. For example, one possible validation could be checking the sensor's current position to an extrapolated value based on the last few positions registered. Another validation check may compare input data from all sensors to determine if a particular sensor is giving positional data outside of the range given by the others (i.e., an outlier search). Additionally, the flight data module 662 provides routines for calculating the IIP for each sensor input and a green time for a sensor if it has stopped updating its input. Green time is the time to the closest boundary based on the last known speed of the vehicle and its position.

A mission data module 664 provides routines for receiving, validating, and storing the mission data limits. A fire decision module 666 provides routines for evaluating the vehicle's state against the rules set in the mission data limits. The decision rules may be implemented in the routines of the fire decision module 666.

In general, the flight data module 662, the mission data module 664, and the fire decision module 666 perform the flight monitoring and flight termination decisions based on information from the various sensors and may be configured such that there are independent analysis paths for each sensor.

Figure 7:
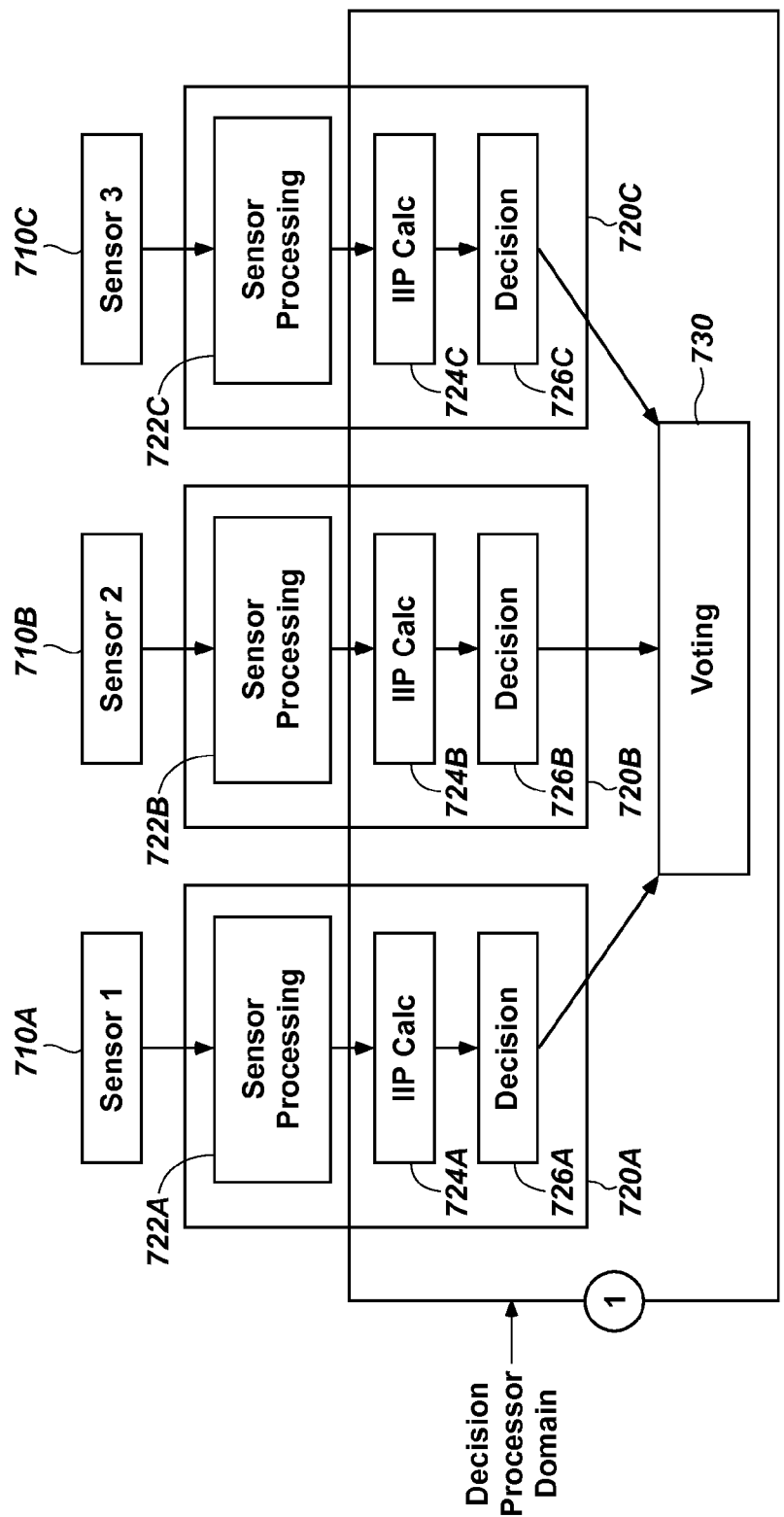
FIG. 7 illustrates three independent analysis paths that may be performed by the autonomous flight safety system.

FIG. 7 illustrates three independent analysis paths (720A, 720B, and 720C) that may be performed by the autonomous flight safety system. In a first independent analysis path 720A, first information from a first sensor 710A is passed to a first sensor-processing module 722A to analyze and prepare the information for additional processing and analysis. A first instantaneous impact point module 724A may use the first sensor information to independently, and substantially continuously, determine a first instantaneous impact point of the aerial vehicle 210 (FIG. 2) or a first projected flight path of the aerial vehicle 210 based on flight data up to that point. A first decision module 726A may compare the first instantaneous impact point module 724A to mission flight rules to determine if the aerial vehicle 210 is projected to stay within a safe window, the instantaneous impact point may intersect with a region to be protected, or the aerial vehicle 210 is projected to leave the safe window.

A second independent analysis path 720B includes a second sensor processing module 722B, a second instantaneous impact point module 724B, and a second decision module 726B and operates in parallel with the first analysis path but uses second sensor information from a second sensor 710B. Thus, the second independent analysis path can use second information from the second sensor 710B to determine a second instantaneous impact point of the aerial vehicle 210 (FIG. 2) or a second projected flight path of the aerial vehicle 210 based on flight data up to that point.

Similarly, a third independent analysis path 720C includes a third sensor processing module 722C, a third instantaneous impact point module 724C, and a third decision module 726C and operates in parallel with the first analysis path and the second analysis path but uses third sensor information from a third sensor 710C. Thus, the third independent analysis path can use third information from the third sensor 710C to determine a third instantaneous impact point of the aerial vehicle 210 (FIG. 2) or a third projected flight path of the aerial vehicle 210 based on flight data up to that point.

Each of the independent analysis paths may be configured to operate substantially simultaneously from a single processor. Operating from a single processor but with independent execution and possibly independent address spaces for the code provides a redundancy capability such that a single software fault will not generate an erroneous flight termination decision.

A voting module 730 receives input from each of the independent analysis paths and performs a voting algorithm as explained more fully below to determine if the flight should be terminated. In general, the instantaneous impact point modules (724A, 724B, and 724C), the decision modules (726A, 726B, and 726C), and the voting module 730 may be implemented in code for execution on the decision module 510 (FIG. 5).

While the use of redundant components increases reliability in hardware by removing single-point failure modes, all processors may be running identical software code, thus creating the possibility that a common single-point software failure, such as divide by zero, could disable (crash) both AFSAs. To prevent this, extensive software independent verification and validation (IV&V), along with operation testing, may be used to generate trust in the software code. Since each AFSA obtains and processes tracking information independent of the other, the likelihood of a common software failure mode taking out both AFSAs simultaneously is extremely low. Each AFSA unit has the option to monitor the other's internal operating health status, called—internal heartbeat monitoring, as well as its own, and actions could be implemented by the remaining unit if the other unit malfunctions and its own internal health status deteriorates for some reason. Since each AFSA can terminate the vehicle, a redundant ordnance system is provided for each AFSA, such as activation of a linear-shaped charge (LSC) on each end. These systems are external to each AFSA. A failure of a heartbeat monitor may not constitute an immediate destruct output action. If a unit fails, then the system may fly on a single unit's decision process.

Figure 8:
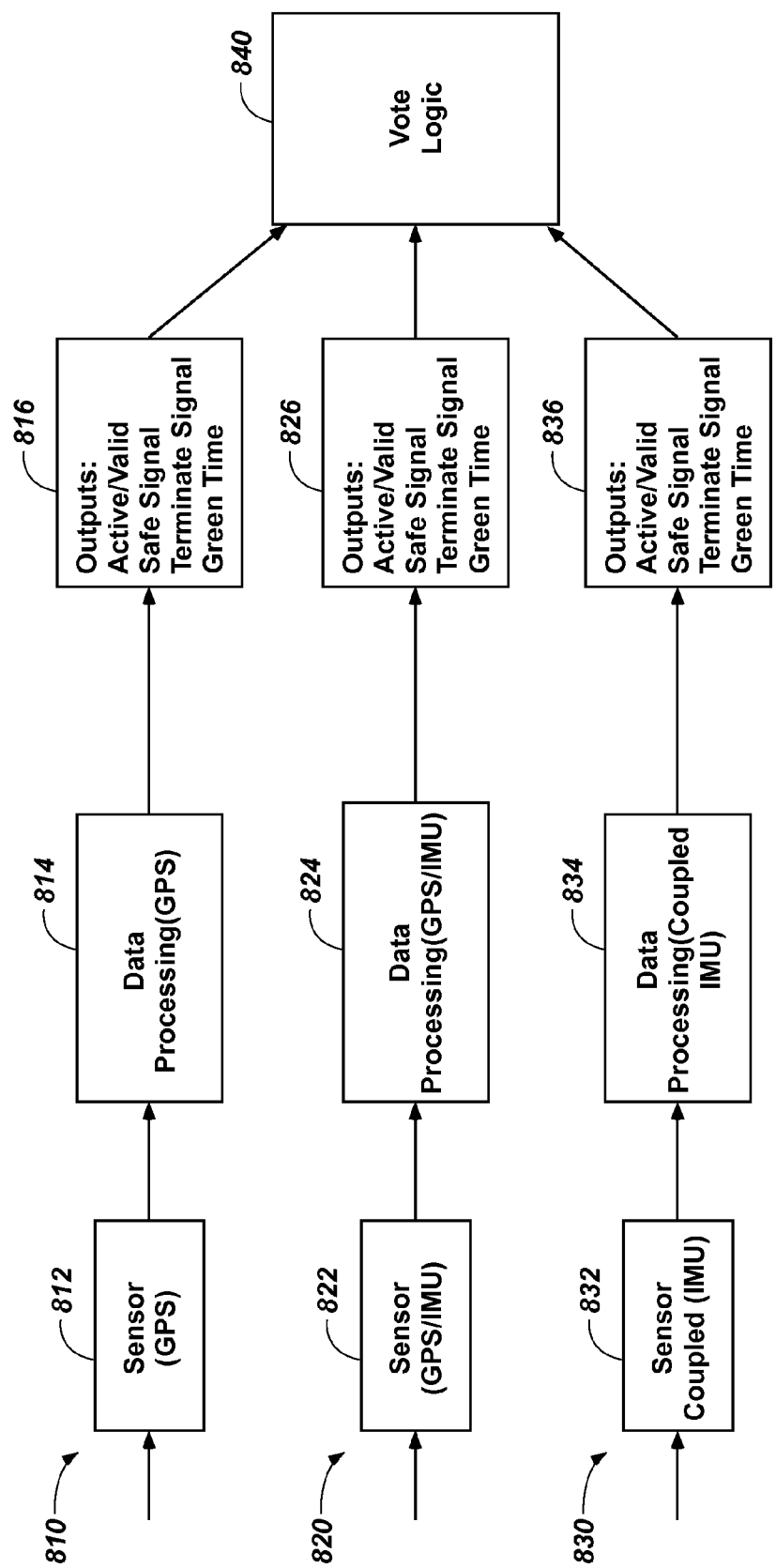
FIG. 8 illustrates another version of the three independent analysis paths showing independent code segments and independent sensor data.

FIG. 8 illustrates another version of three independent analysis paths (810, 820, and 830) showing independent code segments and independent sensor data. FIG. 8 illustrates that first sensor information 812, second sensor information 822, and third sensor information 832 may be stored in different regions of memory, providing redundancy against single fault addressing when accessing data. Similarly, first data processing code 814 for the first sensor information 812, second data processing code 824 for the second sensor information 822, and third data processing code 834 for the third sensor information 832 may be stored in different regions of memory, providing redundancy against single fault addressing when accessing code.

Outputs modules 816, 826, and 836 may be used to provide outputs such as active/valid safe signals, terminate signals, and an indication of green time as explained above. A single vote logic module 840 receives input from each of the independent analysis paths and performs a voting algorithm as explained more fully below to determine if the flight should be terminated.

Figure 9B:
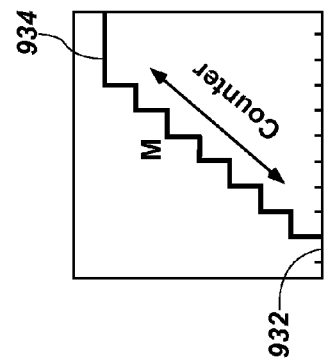
FIG. 9B illustrates an accumulation of termination indicators from multiple analysis processes in the autonomous flight safety system.
Figure 9A:
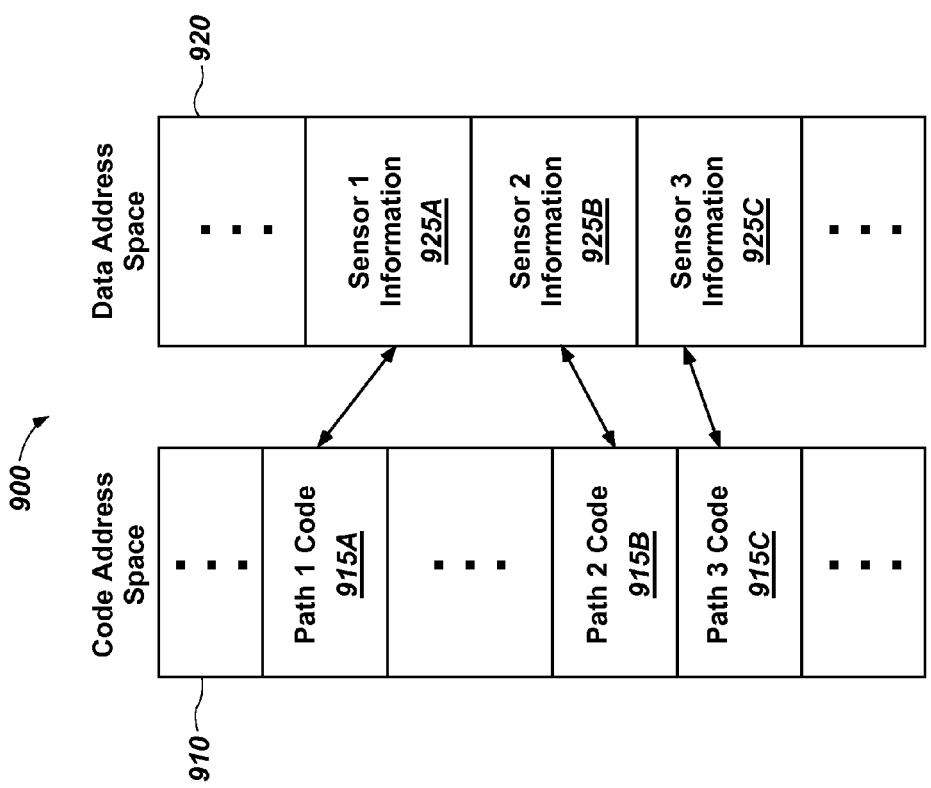
FIG. 9A illustrates a memory organization showing the independent code segments and independent sensor data.

FIG. 9A illustrates a memory organization 900 showing independent code segments (915A, 915B, and 915C) and independent sensor data regions (925A, 925B, and 925C). In some memory architectures a code address space 910 may be separate from a data address space 920, as illustrated in FIG. 9A. In other memory architectures, the code and data may be intermingled. As mentioned above, the independent address spaces for different paths provide redundancy against single fault addressing when accessing code and data.

As a non-limiting example, software in a first code region 915A may be configured to access sensor information in a first data region 925A. Similarly, software in a second code region 915B may be configured to access sensor information in a second data region 925B and software in a third code region 915C may be configured to access sensor information in a third data region 925C.

In some embodiments, separate data regions (925A, 925B, and 925C) may be used, but a single code module may be used to process each of the separate sensor data regions. Such embodiments may sacrifice redundancy on code addressing to gain additional memory space for code or provide easier code development.

FIG. 9B illustrates an accumulation of termination indicators from multiple analysis processes in the autonomous flight safety system. As a non-limiting example, and referring to FIGS. 8 and 9B, a destruct rule violation may increment a separate counter one-step for each analysis path, which may be reported at rate of 10 Hz. An analysis indicating no violation may decrement the counter one-step. Initially the counter may be set to zero 932 and increments up to a maximum (M) 934. Thus, the step counter increments and decrements between zero and M, where M is the maximum number of steps defined in the mission data load as related to firing timing. When M is reached, an onboard flight termination indicator is set for that analysis path. Thus, each analysis path provides its own independent terminate flag for voting.

Each step represents a cycle through a processing loop, with the number of cycles needed to reach the destruct command being user-configurable through mission data downloaded to the AFSS. As a non-limiting example, a nominal number of three to seven cycles may be used. As seen from FIG. 9B, if voting of sensor inputs continuously generates a terminate outcome, then the system destruct counter goes up until the thresholds implemented are reached. Prior to reaching these thresholds, if the voting results in a non-terminate outcome, then the system destruct counter is decremented appropriately through each processing cycle for which this happens. It should be noted that with a nominal 10-Hz processing cycle implementation, each step corresponds to about 100 milliseconds. Thus, in accordance with FIG. 9B, it would take about 700 milliseconds to reach a destruct command to be issued to the ordnance initiator. As mentioned earlier, this time is user configurable, and furthermore, needs to be taken into account when generating the appropriate destruct lines to be used for the AFSS for a particular mission.

In the voting, the decision module 510 (FIG. 5) receives real-time tracking source data from three independent navigation sources and determines the IIP for all three signals as part of a main loop process. Based on the IIP calculation and taking into account sensor flags that may deem data as valid or invalid, voting then occurs on each sensor data to determine if a flight should be terminated. Typically, with all sensors being weighted the same, the most conservative outcome wins, which means that if 50 percent or more of the valid sensors indicate a hazardous condition has been reached, then a fire command is issued. Note that in the case of all three sensors being valid, the majority, i.e., two out of three, wins the voting outcome. In the case that only two sensors are valid, then if one of these sensors leads to a terminate decision, it then wins the voting outcome and a destruct command is issued following an appropriate count up. In some embodiments, different sensors may be weighted differently and the software can easily accommodate the use of weighting functions as defined by mission data.

Figure 10:
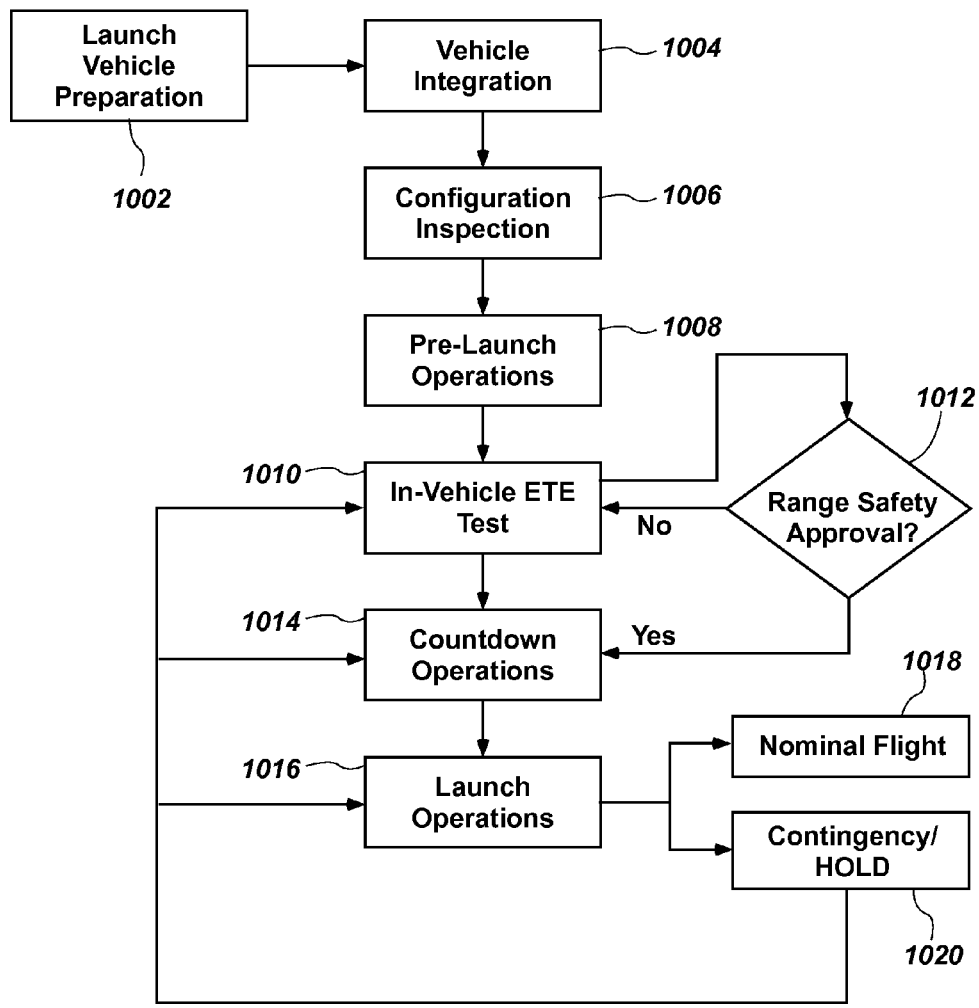
FIG. 10 illustrates a flow diagram of processes performed in preparation and flight of an aerial vehicle including an autonomous flight safety system.

FIG. 10 illustrates a flow diagram of processes performed in preparation and flight of an aerial vehicle including an autonomous flight safety system. AFSS vehicle integration, along with further configuration and end-to-end tests, occurs at the vehicle integration site and/or launch site. After passing range safety approvals, the vehicle with the AFSS installed is ready for launch. If all goes as planned, the vehicle lifts off the pad with the AFSS fully armed and ready to take action in the event the vehicle becomes hazardous during its mission launch to orbit. Should the launch be aborted prior to lift-off, the AFSS is commanded to a safe state so that personnel may approach the pad to review the situation.

Launch vehicle preparation 1002 may be performed to ensure that the launch vehicle is in condition for a launch. Vehicle integration 1004 and configuration inspection 1006 may be performed to place the AFSS in the launch vehicle and inspect that the AFSS is configured properly. Pre-launch operations 1008 may be performed to ensure that the AFSS and launch vehicle are operating properly.

In-vehicle end-to-end testing and verification 1010 may be configured to exercise the AFSS as completely as possible in a pre-launch configuration. An artificial GPS input (e.g., a GPS hat over antenna) may be generated to the GPS antenna to artificially fly the vehicle and simulate good flights within the safety zone and bad flights outside the safety zone to make sure operations are performed correctly. Outputs that normally go to safe and arm controls may be provided to a simulator to verify proper operation. With a successful end-to-end testing, the output can be reconnected and the GPS stimulus removed to prepare the AFSS for launch.

Decision block 1012 indicates that after end-to-end testing the process waits for range safety approval to begin a countdown operation. If range safety approval is delayed for a significant amount of time (e.g., more than a day), in-vehicle end-to-end testing and verification 1010 may be repeated.

If range safety approval is granted, a countdown operation 1014 begins and the process proceeds to launch operations 1016. In general, launch operations 1016 may last for 20 days before launch. Proper operations of the AFSS may be periodically monitored during this time.

At the end of the launch operations 1016 and completion of the countdown operation 1014, a nominal flight 1018 may occur. Alternatively, a contingency/hold process 1020 may be entered to stop flight due to some type of delay. Once in the contingency/hold process 1020, operation will resume at the launch operations 1016 if the hold is for about five minutes or less, at the countdown operations if the hold is for a day or two, and at the in-vehicle end-to-end testing and verification 1010 for longer time periods.

Figure 11:
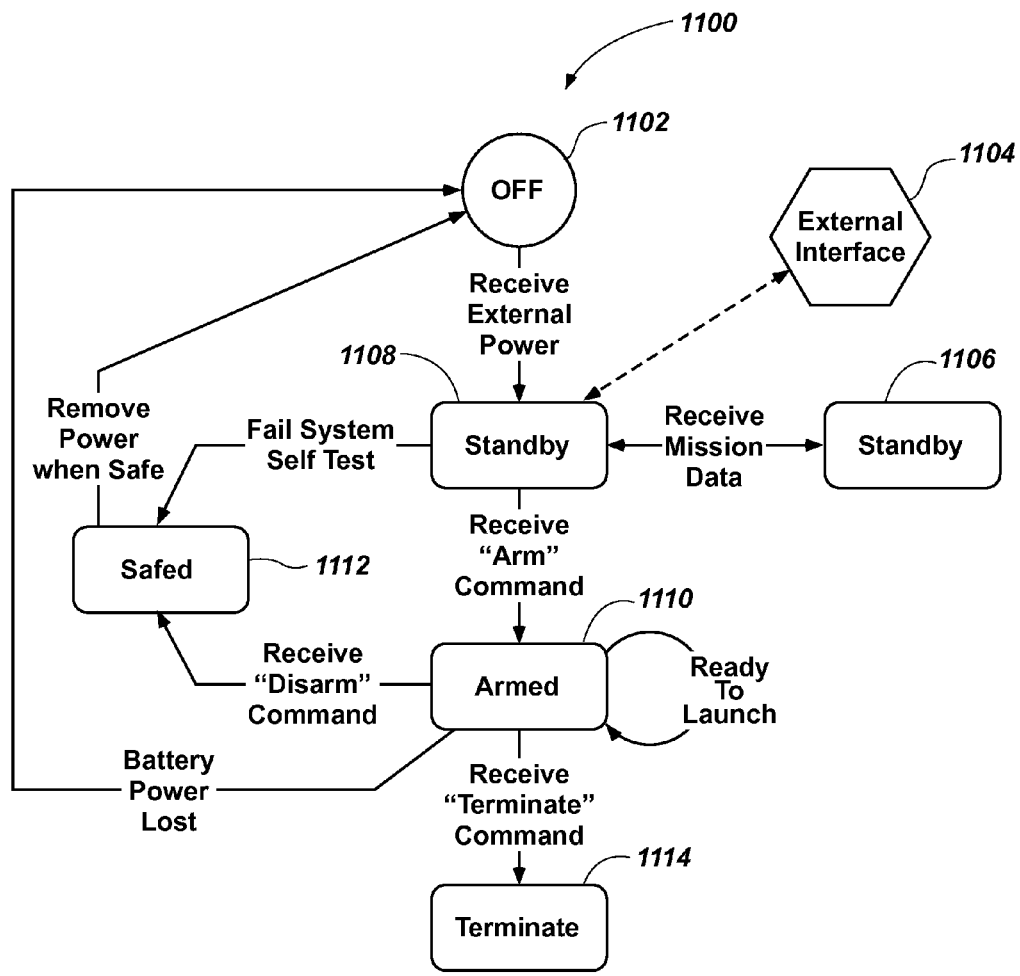
FIG. 11 illustrates a flow diagram of a flight termination decision according to one or more embodiments of the present disclosure.

FIG. 11 illustrates a flow diagram of a flight termination decision according to one or more embodiments of the present disclosure. Process 1100 begins in an off mode 1102. In the off mode 1102, there is no power applied to the AFSS from external power or an internal battery. Once external power is applied, the system transitions to an initialize mode 1104. The initialize mode 1104 may be entered from the off mode 1102 so data may be transferred from the ground system to the AFSS mission data memory and verified. Mission data may be verified on a bit-by-bit basis through a checksum. The initialize mode 1104 allows for mission data programming to occur. This mode provides a measure of protection for programming by having a separate mode that can only be entered into by a specific path, thereby protecting the device from accidental file corruption. Program data can also be verified on a bit-by-bit basis but generally cannot be programmed at this level for safety reasons. Upon successful completion of the initialize mode 1104, the process 1100 enters a standby mode 1108.

The standby mode 1108 is the central mode of operation prior to arming. In standby, the system executes self-test and monitors external communication. When commanded by the ground interface, the system will move from external power to battery power while remaining in the standby mode 1108. Upon receipt of a valid command, the system will transition to a flight enable mode 1110. While in the standby mode 1108, if a failure is detected prior to launch, the system will report the failure and transition to a safed mode 1112.

The safed mode 1112 may be entered from the standby mode 1108 if the system has detected a fault (e.g., memory corruption) or from the flight enable mode 1110 if the system has received a command to disarm. In the safed mode 1112, the system will verify there is no power on fire capacitors and all the systems have been shut down. Once the system has been verified safe, the battery power will be removed and the system transitioned to the off mode 1102.

The flight enable mode 1110 is activated just before launch. Once the system is enabled, it will remain in the flight enable mode 1110 until a disarm (stand down) command is received from the ground or the vehicle has reach the end of the ranges flight safety responsibility portion of its mission. If battery power is lost while in the flight enable mode 1110, the system will return to the off mode 1102. In the flight enable mode 1110, the fire capacitors are fully charged and ready to terminate flight. In this mode, the decision module 510 (FIG. 5) is monitoring the IIP calculations from each sensor input and determining if a safety rule has been violated. If a sequence of these rules has been violated, a fire signal will be generated to terminate the flight. The system will remain in the flight enable mode 1110 until commanded to disarm, commanded to terminate the flight, or when battery power is lost.

The terminate mode 1114 is reached when a violation of a safety rule is encountered and the flight needs to be terminated. Once in the terminate mode 1114, the system will initiate the ordnance that will render the vehicle non-propulsive (e.g., destroyed, propulsion terminated, or a combination thereof). The system will then proceed to lock itself up and do nothing more.

Figure 12:
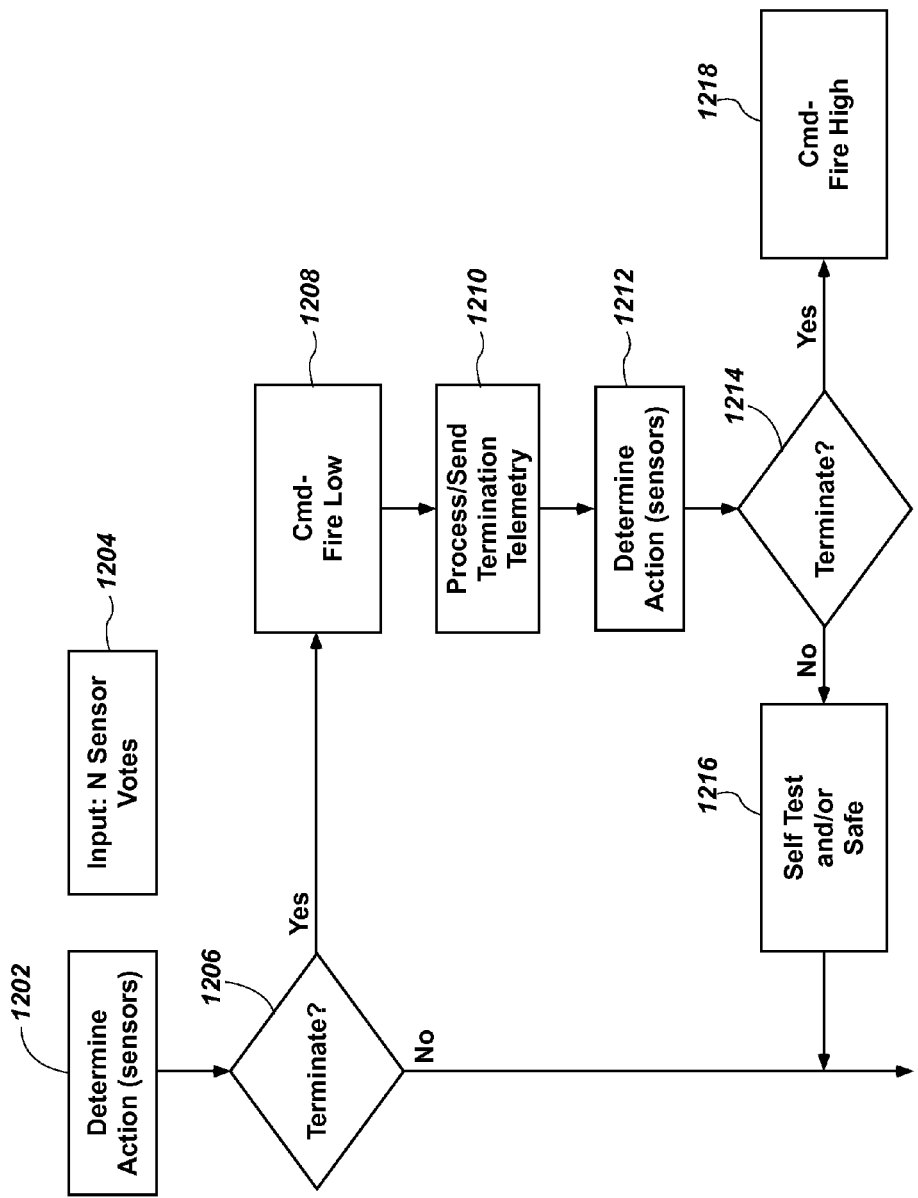
FIG. 12 illustrates a flow diagram for generating fire control signals.
Figure 13:
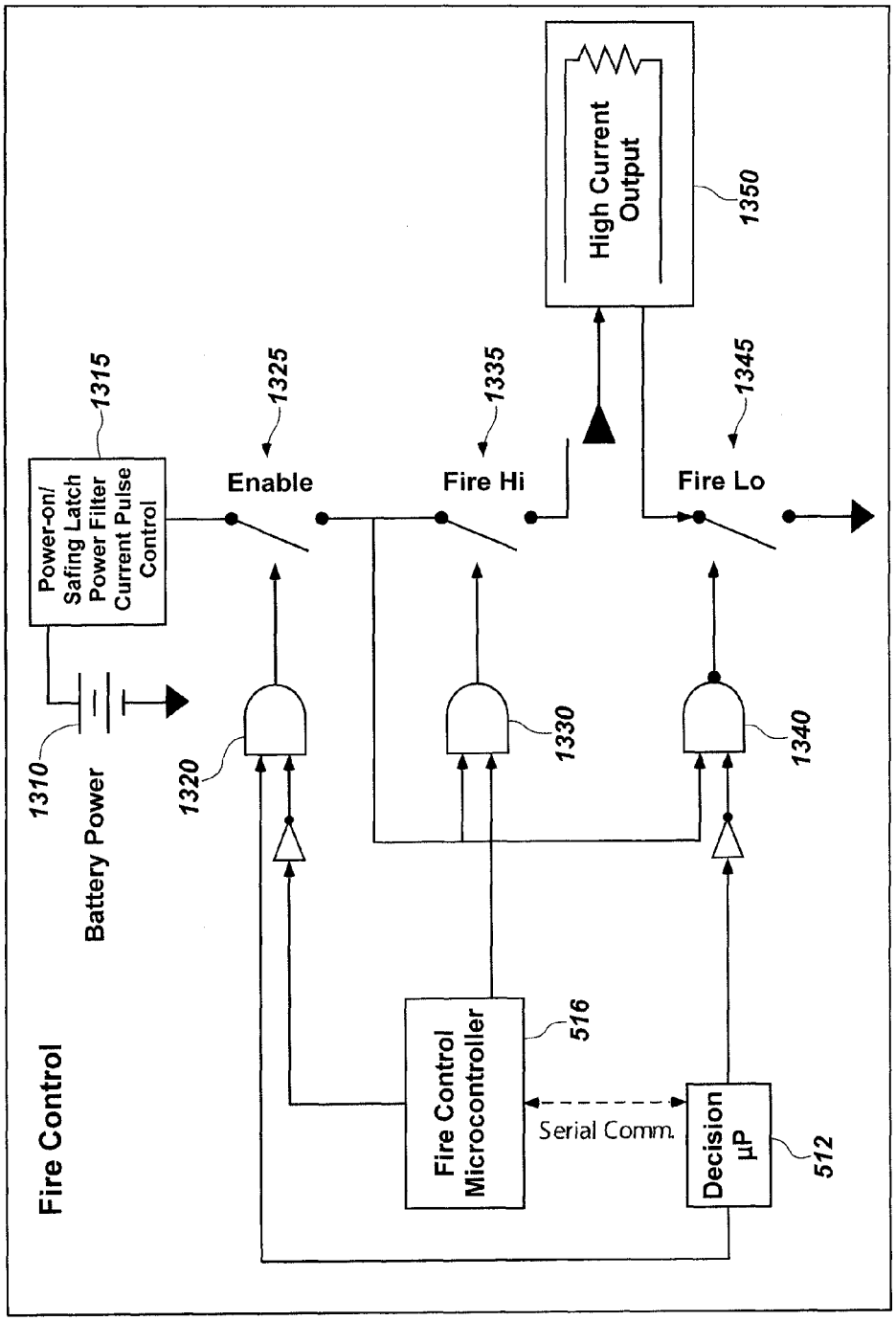
FIG. 13 is a simplified circuit diagram illustrating a fire controller.

FIG. 12 illustrates a flow diagram for generating fire control signals. FIG. 13 is a simplified circuit diagram illustrated a fire controller. FIGS. 12 and 13 will be described together. In FIG. 13, power control electronics 1315 receives power from a battery 1310 and may include functions to enable power to the fire control logic, provide a safing latch to remove power, filter the power, and provide current pulse control.

An enable switch 1325 may be closed just prior to lift off (e.g., about 30 seconds before lift off). Alternatively, in some embodiments, this turn on time may be configured in the mission data load to also require a lift off sensor before the enable switch 1325, if an individual range prefers the option. The enable switch 1325 may be controlled by an active low signal from the fire control processor 516 and an active high signal from the flight decision processor 512 to AND-gate 1320, which controls the enable switch 1325. Generally, the enable switch 1325 stays on during the entire flight while processing sensors until a destruct mode or safe mode is entered at end of flight.

Referring to FIG. 12, the termination process begins at operation block 1202 where actions are determined based on input 1204 from the voting process of the independent analysis paths for the sensors, as described above. Decision block 1206 indicates a test to determine whether the flight should be terminated. If not, the process ends and is repeated next time through an evaluation loop.

If decision block 1206 indicates that a termination should occur, operation block 1208 indicates a command fire low signal should be generated. The flight decision processor 512 generates an active low signal, which is inverted to drive an input of NAND-gate 1340. If the enable switch 1325 is also closed, the NAND-gate 1340 will assert an active low output to turn on a fire-low switch 1345.

Operation block 1210 indicates that termination telemetry may be processed and sent to ensure that the aerial vehicle 210 (FIG. 2), ground based operations, or a combination thereof receive information about the status of the AFSS and what caused the termination decision.

Operation block 1212 indicates that the voting process of the independent analysis paths for the sensors is performed again to verify that the termination should finalize. Decision block 1214 indicates that if operation block 1212 returned a decision not to terminate, operation block 1216 is performed to enter a safe mode, a self-test mode, or end the process for this time through the evaluation loop.

If the second voting process indicates that the flight should terminate, operation block 1218 indicates a command fire high signal should be generated. The fire control processor 516 generates an active high signal to AND-gate 1330. If the enable switch 1325 is also closed, the AND-gate 1330 will assert an active high output to turn on a fire-high switch 1335. Closing the fire-high switch 1335 completes a current bath through a high current output 1350 and between the battery 1310 and ground.

The high-current output 1350 may be used to drive additional safe and arm functions (not shown) to activate an explosive to destroy the aerial vehicle 210 (FIG. 2) or activate other termination mechanisms to terminate the flight of the aerial vehicle 210.

An end of mission condition may also been implemented. The AFSS processor may execute a disarm command and place itself in the safed mode 1112 (FIG. 11) as a result of a gate rule condition that has been met. Note that once in the safed mode 1112, there is not a path to getting back to the arm mode 1110 other than a power-off and then power-on procedure that can only be implemented via connectivity to the ground.

Flight safing may be configured to generate a signal from the flight decision processor 512 (FIG. 5) using the voting sequencing to provide a safe signal. As a non-limiting example, a majority of the sensors must indicate the flight safety system end of mission gate have been met.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A flight safety assembly onboard an aerial vehicle, comprising:
   a first sensor configured to sense first information related to flight of the aerial vehicle;
   a second sensor configured to sense second information related to the flight of the aerial vehicle;
   a sensor input adapted to receive third information related to the flight of the aerial vehicle; and
   a processor operably coupled to the first sensor, the second sensor, and the sensor input, and configured to:
      determine three independent instantaneous impact points for the aerial vehicle by independently analyzing each of the first information, the second information and the third information; and
      generate three independent onboard flight termination indicators for each of the three independent instantaneous impact points that intersects with a region to be protected.

2. The flight safety assembly of claim 1, wherein the first sensor comprises a combination of a global positioning system and an inertial management unit and the second sensor includes a second global positioning system.

3. The flight safety assembly of claim 2, further comprising a third sensor external to the flight safety assembly and configured to generate the third information for the sensor input from at least one of a third global positioning system and a second inertial management unit.

4. The flight safety assembly of claim 1, wherein the processor is further configured to repeat the determining and generating a plurality of times and the aerial vehicle further comprises a termination mechanism operably coupled to the flight safety assembly and configured to terminate the flight of the aerial vehicle if at least one of the three independent onboard flight termination indicators is active for the plurality of times.

5. The flight safety assembly of claim 4, wherein the termination mechanism is configured to terminate the flight by at least one of activating an explosive onboard the aerial vehicle and disabling propulsion of the aerial vehicle.

6. The flight safety assembly of claim 1, wherein the processor is further configured to determine when a flight has been completed successfully and place the flight safety assembly in a safe mode.

7. A method for determining safety parameters of an aerial vehicle, comprising:
   sensing first information related to flight of the aerial vehicle and sensing second information related to the flight of the aerial vehicle using one or more sensors;
   receiving third information related to the flight of the aerial vehicle from a sensor input;
   determining three independent instantaneous impact points for the aerial vehicle by independently analyzing each of the first information, the second information and the third information; and
   generating three independent onboard flight termination indicators for each of the independent instantaneous impact points that intersects with a region to be protected.

8. The method of claim 7, wherein:
   sensing the first information comprises a combination of sensing a global positioning system location and sensing inertial parameters responsive to motion of the aerial vehicle; and
   sensing the second information comprises sensing a second global positioning system location.

9. The method of claim 8, wherein the third information is received from at least one of sensing a third global positioning system location and sensing second inertial parameters responsive to the motion of the aerial vehicle.

10. The method of claim 7, further comprising:
    repeating determining the three independent instantaneous impact points and generating the three independent onboard flight termination indicators a plurality of times; and
    terminating the flight of the aerial vehicle if at least one of the three independent onboard flight termination indicators is active for the plurality of times.

11. The method of claim 10, wherein terminating the flight of the aerial vehicle comprises at least one of activating an explosive onboard the aerial vehicle and disabling propulsion of the aerial vehicle.

12. The method of claim 7, further comprising determining when a flight has been completed successfully and placing the flight safety assembly in a safe mode.

13. A flight safety system for an aerial vehicle, comprising:
    two autonomous flight safety assemblies onboard the aerial vehicle, each of the two autonomous flight safety assemblies comprising:
       a first sensor configured to sense first information related to flight of the aerial vehicle;
       a second sensor configured to sense second information related to the flight of the aerial vehicle; and a processor operably coupled to the first sensor and the second sensor and configured to:
analyze the first information to determine a first projected flight path of the aerial vehicle;
analyze the second information to determine a second projected flight path of the aerial vehicle; and
generate an onboard flight termination signal if at least one of the first projected flight path and the second projected flight path indicates that the aerial vehicle will leave a safe window or violate a boundary that designates a keep-in or keep-out zone or area.

14. The flight safety system of claim 13, wherein each of the two autonomous flight safety assemblies further comprises a sensor input operably coupled to the processor and a sensor output operably coupled to one of the first sensor or the second sensor, and the sensor input of from each of the two autonomous flight safety assemblies is coupled to the sensor output of the other of the two autonomous flight safety assemblies.

15. The flight safety system of claim 14, wherein the processor in each of the two autonomous flight safety assemblies is further configured to:
analyze third information from the sensor input to determine a third projected flight path of the aerial vehicle; and
generate the onboard flight termination signal if at least one of the first projected flight path, the second projected flight path, and the third projected flight path indicates that the aerial vehicle will leave the safe window.

16. The flight safety system of claim 13, wherein the first sensor comprises a combination of a global positioning system and an inertial management unit and the second sensor includes a second global positioning system.

17. The flight safety system of claim 13, further comprising a termination mechanism operably coupled to the two autonomous flight safety assemblies and configured to terminate the flight of the aerial vehicle if the onboard flight termination signal from at least one of the two autonomous flight safety assemblies is asserted.

18. The flight safety system of claim 17, wherein the termination mechanism is configured to terminate the flight by at least one of activating an explosive onboard the aerial vehicle and disabling propulsion of the aerial vehicle.

19. A flight safety system for an aerial vehicle, comprising:
a first sensor configured to sense first information related to flight of the aerial vehicle;
a second sensor configured to sense second information related to the flight of the aerial vehicle;
a third sensor configured to sense third information related to the flight of the aerial vehicle;
a fourth sensor configured to sense fourth information related to the flight of the aerial vehicle;
a first processor operably coupled to the first sensor, the second sensor, and the third sensor and configured to:
analyze the first information, the second information, and the third information to determine a first projected flight path of the aerial vehicle;
determine if the first projected flight path remains within a safe window; and
generate a first onboard flight termination signal responsive to the determining; and
a second processor operably coupled to the second sensor, the third sensor, and the fourth sensor and configured to:
analyze the second information, the third information, and the fourth information to determine a second projected flight path of the aerial vehicle;
determine if the second projected flight path remains within the safe window; and
generate a second onboard flight termination signal responsive to the determining.

20. The flight safety system of claim 19, wherein:
the first sensor and the third sensor each comprises a combination of a global positioning system and an inertial management unit; and
the second sensor and the fourth sensor each includes an additional global positioning system.

21. The flight safety system of claim 19, further comprising a termination mechanism operably coupled to the first processor and the second processor and configured to terminate the flight of the aerial vehicle if at least one of the first onboard flight termination signal and the second onboard flight termination signal is asserted.

22. The flight safety system of claim 21, wherein the termination mechanism is configured to terminate the flight by at least one of activating an explosive onboard the aerial vehicle and disabling propulsion of the aerial vehicle.

23. A method for determining safety parameters of an aerial vehicle, comprising:
developing at least two independent analysis paths of a flight path of the aerial vehicle, wherein each of the at least two independent analysis paths are performed onboard the aerial vehicle and include the acts of:
sensing one or more parameters related to the flight of the aerial vehicle; and
determining a projected flight path of the aerial vehicle with one or more processors responsive to the one or more parameters; and
generating an onboard flight termination signal if at least one of the at least two independent analysis paths indicate the aerial vehicle will leave a safe window.

24. The method of claim 23, further comprising terminating the flight of the aerial vehicle responsive to the onboard flight termination signal by at least one of activating an explosive onboard the aerial vehicle and disabling propulsion of the aerial vehicle.

25. The method of claim 23, wherein sensing the one or more parameters comprises sensing a global positioning system location and sensing inertial parameters responsive to motion of the aerial vehicle in one of the at least two independent paths and sensing a second GPS location in another of the at least two independent paths.

26. A method for determining safety parameters of an aerial vehicle, comprising:
sensing first information related to flight of the aerial vehicle;
sensing second information related to the flight of the aerial vehicle;
sensing third information related to the flight of the aerial vehicle;
sensing fourth information related to the flight of the aerial vehicle;
analyzing the first information, the second information, and the third information with one or more processors to determine a first projected flight path of the aerial vehicle;
analyzing the second information, the third information, and the fourth information with at least one of the one or more processors to determine a second projected flight path of the aerial vehicle;
generating a first onboard flight termination signal if the first projected flight path indicates the aerial vehicle will leave a safe window; and generating a second onboard flight termination signal if the second projected flight path indicates the aerial vehicle will leave the safe window.

27. The method of claim 26, further comprising terminating the flight of the aerial vehicle if at least one of the first onboard flight termination signal and the second onboard flight termination signal is asserted.

28. The method of claim 26, wherein:
sensing the first information and sensing the third information each comprises a combination of sensing a global positioning system location and sensing inertial parameters responsive to motion of the aerial vehicle; and
sensing the second information and sensing the fourth information each comprises sensing an additional global positioning system location.

29. A method for determining safety parameters of an aerial vehicle, comprising:
analyzing a flight path of the aerial vehicle onboard the aerial vehicle, comprising:
sensing at least two parameters related to the flight of the aerial vehicle with one or more sensors;
determining a projected flight path of the aerial vehicle responsive to the at least two parameters; and
analyzing the projected flight path relative to a safe window;
generating an onboard flight termination indicator if the analyzing the projected flight path indicates the aerial vehicle will leave the safe window;
repeating analyzing the flight path and generating the onboard flight termination indicator a plurality of times; and
generating an onboard flight termination signal if the onboard flight termination indicator is active for the plurality of times.

30. The method of claim 29, wherein determining the projected flight path of the aerial vehicle comprises determining an instantaneous impact point of the aerial vehicle if the aerial vehicle loses propulsion.

31. The method of claim 30, further comprising terminating flight of the aerial vehicle if the instantaneous impact point is in violation of at least one of a range safety boundary, failure to achieve a satisfactory proper orbit, or a violation of a flight safety rule.

32. The method of claim 29, further comprising terminating flight of the aerial vehicle responsive to the onboard flight termination signal by activating an explosive onboard the aerial vehicle.

33. The method of claim 29, further comprising terminating flight of the aerial vehicle responsive to the onboard flight termination signal by disabling propulsion of the aerial vehicle.

34. The method of claim 29, wherein sensing at least two parameters comprises sensing a global positioning system location and sensing inertial parameters responsive to motion of the aerial vehicle.

35. A flight safety assembly onboard an aerial vehicle, comprising:
a first sensor configured to sense first information related to flight of the aerial vehicle;
a second sensor configured to sense second information related to the flight of the aerial vehicle;
a memory configured to store the first information in a first region and the second information in a second region; and
a processor operably coupled to the first sensor, the second sensor, and the memory, the processor configured for:
performing computing instructions using the first information to determine a first instantaneous impact point for the aerial vehicle and generate a first onboard flight termination indicator if the first instantaneous impact point intersects with a region to be protected; and
performing the computing instructions using the second information to determine a second instantaneous impact point for the aerial vehicle and generate a second onboard flight termination indicator if the second instantaneous impact point intersects with the region to be protected.

36. The flight safety assembly of claim 35, wherein:
performing the computing instructions using the first information uses computing instructions in a first code region of the memory; and
performing the computing instructions using the second information uses computing instructions in a second code region of the memory.

37. The flight safety assembly of claim 35, wherein the processor is further configured for:
repeating, a plurality of times, performing the computing instructions using the first information to determine the first instantaneous impact point and performing the computing instructions using the second information to determine the second instantaneous impact point; and
terminating the flight of the aerial vehicle if at least one of the first onboard flight termination indicator and the second onboard flight termination indicator is active for the plurality of times.

38. The flight safety assembly of claim 35, further comprising a termination mechanism operably coupled to the processor and configured to terminate the flight of the aerial vehicle if at least one of the first onboard flight termination indicator and the second onboard flight termination indicator is active.

39. The flight safety assembly of claim 38, wherein the termination mechanism is configured to terminate the flight by at least one of activating an explosive onboard the aerial vehicle and disabling propulsion of the aerial vehicle.

40. The flight safety assembly of claim 35, wherein the first sensor comprises a combination of a global positioning system and an inertial management unit and the second sensor includes a second global positioning system.

41. The flight safety assembly of claim 40, further comprising a third sensor external to the flight safety assembly and configured to generate third information for a sensor input from at least one of a third global positioning system and a second inertial management unit and wherein the processor is further configured for performing computing instructions using the third information to determine a third instantaneous impact point for the aerial vehicle and generate a third onboard flight termination indicator if the third instantaneous impact point intersects with the region to be protected.

42. A method for determining safety parameters of an aerial vehicle, comprising:
receiving sensor information from at least two different sensors, each sensor for sensing one or more parameters related to flight of the aerial vehicle;
storing the sensor information from the at least two different sensors in at least two corresponding and independent regions of a memory;
processing the sensor information in a first of the independent regions of the memory to:
determine a first projected flight path of the aerial vehicle; and generate a first onboard flight termination signal if the first projected flight path indicates that the aerial vehicle will leave a safe window; and processing the sensor information in a second of the independent regions of the memory to:
determine a second projected flight path of the aerial vehicle; and
generate a second onboard flight termination signal if the second projected flight path indicates that the aerial vehicle will leave the safe window.

43. The method of claim 42, wherein:
processing the sensor information in the first of the independent regions uses computing instructions in a first code region of the memory; and
processing the sensor information in the second of the independent regions uses computing instructions in a second code region of the memory.

44. The method of claim 42, wherein:
receiving the sensor information from a first of the at least two different sensors comprises receiving a combination of a global positioning system location and inertial parameters responsive to motion of the aerial vehicle; and
receiving the sensor information from a second of the at least two different sensors comprises receiving a second global positioning system location.

45. The method of claim 42, further comprising:
receiving third sensor information from a third sensor for sensing one or more parameters related to the flight of the aerial vehicle; and
storing the third sensor information in a corresponding and third independent region of the memory;
wherein processing the sensor information comprises also processing the third sensor information.

46. The method of claim 45, wherein receiving the third sensor information comprises receiving at least one of a global positioning system location and inertial parameters responsive to motion of the aerial vehicle.

47. The method of claim 42, further comprising:
repeating, a plurality of times, the acts of receiving the sensor information, storing the sensor information, processing the sensor information in the first of the independent regions to generate the first onboard flight termination signal, and processing the sensor information in the second of the independent regions to generate the second onboard flight termination signal; and
terminating the flight of the aerial vehicle if at least one of the first onboard flight termination signal and the second onboard flight termination signal is active for the plurality of times.

48. The method of claim 47, wherein terminating the flight of the aerial vehicle comprises at least one of activating an explosive onboard the aerial vehicle and disabling propulsion of the aerial vehicle.

49. A method for determining safety parameters of an aerial vehicle, comprising:
receiving sensor information from at least two different sensors, each sensor for sensing one or more parameters related to flight of the aerial vehicle;
storing the sensor information from the at least two different sensors in a memory; and
processing the sensor information with at least two code segments in independent address spaces of the memory wherein each of the at least two code segments:
analyzes the sensor information to determine a projected flight path of the aerial vehicle;
determines if the projected flight path of the aerial vehicle is within a safe window; and
generates an onboard flight termination signal if the aerial vehicle will leave the safe window.

50. The method of claim 49, wherein:
storing the sensor information from the at least two different sensors in at least two corresponding and independent regions of the memory; and
processing the sensor information with the at least two code segments comprises processing information in one of the independent regions of the memory with one of the at least two code segments and processing information in another of the independent regions of the memory with another of the at least two code segments.

51. The method of claim 49, wherein receiving the sensor information from the at least two different sensors comprises receiving first sensor information from a combination of a global positioning system and an inertial management unit and receiving second sensor information from a second global positioning system.

52. The method of claim 51, further comprising:
receiving third sensor information from a third sensor for sensing one or more parameters related to the flight of the aerial vehicle; and
storing the third sensor information in a corresponding and third independent region of the memory;
wherein processing the sensor information comprises also processing the third sensor information.

53. The method of claim 52, wherein receiving the third sensor information comprises receiving at least one of a global positioning system location and inertial parameters responsive to motion of the aerial vehicle.

54. The method of claim 49, further comprising:
repeating processing the sensor information to generate the onboard flight termination signal a plurality of times; and
terminating the flight of the aerial vehicle if the onboard flight termination signal is active for the plurality of times.

55. The method of claim 54, wherein terminating the flight of the aerial vehicle comprises at least one of activating an explosive onboard the aerial vehicle and disabling propulsion of the aerial vehicle.

* * * * *